US009607185B2

(12) United States Patent
Jones et al.

(10) Patent No.: US 9,607,185 B2
(45) Date of Patent: *Mar. 28, 2017

(54) SYSTEMS AND METHODS FOR SECURE SUPPLY CHAIN MANAGEMENT AND INVENTORY CONTROL

(71) Applicant: Mojix, Inc., Los Angeles, CA (US)

(72) Inventors: Christopher R. Jones, Pacific Palisades, CA (US); Ramin Sadr, Los Angeles, CA (US)

(73) Assignee: Mojix, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/710,267

(22) Filed: Dec. 10, 2012

(65) Prior Publication Data

US 2013/0099901 A1   Apr. 25, 2013

Related U.S. Application Data

(63) Continuation of application No. 12/522,645, filed as application No. PCT/US2008/050574 on Jan. 9, (Continued)

(51) Int. Cl.
*H04Q 5/22* (2006.01)
*H04L 29/06* (2006.01)
(Continued)

(52) U.S. Cl.
CPC ........... *G06K 7/01* (2013.01); *G06K 17/0029* (2013.01); *G06Q 10/08* (2013.10); *G06K 2017/0051* (2013.01); *H04L 2209/805* (2013.01)

(58) Field of Classification Search
CPC ...... G06K 7/14; G06K 7/1491; G06K 7/0008; G06K 17/00; G06K 17/0029; G06K 2017/0051
(Continued)

(56) References Cited

U.S. PATENT DOCUMENTS 5,764,138 A   6/1998   Lowe
5,799,092 A   8/1998   Kristol et al.
(Continued)

FOREIGN PATENT DOCUMENTS

EP     1324255 A2      7/2003
JP     2002092114 A    3/2002
(Continued)

OTHER PUBLICATIONS

International Search Report and Written Opinion for International Application No. PCT/US08/50574, International Filing Date Jan. 9, 2008, Search completed Apr. 25, 2008, Mailed May 16, 2008, 7 pgs.
(Continued)

*Primary Examiner* — Firmin Backer
*Assistant Examiner* — Adnan Aziz
(74) *Attorney, Agent, or Firm* — KPPB LLP

(57) ABSTRACT

Systems for encoding and reading RFID tags on a collection of items are shown. One embodiment of the invention includes a plurality of items, where each item possesses an item identifier string, and a plurality of RFID tags, where an RFID tag is affixed to each of the items and each RFID tag is encoded with a code word element generated using at least all of the item identifier strings. In many embodiments, the collection is a plurality of goods contained within a case, pallet, container or storage area.

13 Claims, 25 Drawing Sheets

Related U.S. Application Data 2008, now Pat. No. 8,332,656, which is a continuation of application No. 11/947,474, filed on Nov. 29, 2007, now Pat. No. 8,174,369.

(60) Provisional application No. 60/884,197, filed on Jan. 9, 2007, provisional application No. 60/978,346, filed on Oct. 8, 2007.

(51) Int. Cl.
    *G06K 7/01*     (2006.01)
    *G06K 17/00*     (2006.01)
    *G06Q 10/08*     (2012.01)

(58) Field of Classification Search
    USPC ............................ 340/10.51; 235/375, 451
    See application file for complete search history.

(56) References Cited

U.S. PATENT DOCUMENTS

| | | | |
|---|---|---|---|
| 5,974,150 A * | 10/1999 | Kaish et al. | 713/179 |
| 6,259,367 B1 * | 7/2001 | Klein | 340/572.1 |
| 6,970,070 B2 * | 11/2005 | Juels et al. | 340/10.1 |
| 7,009,496 B2 | 3/2006 | Arneson et al. | |
| 7,249,259 B1 * | 7/2007 | Vanstone et al. | 713/180 |
| 7,322,514 B2 * | 1/2008 | Lubow | 235/375 |
| 7,378,967 B2 | 5/2008 | Sullivan et al. | |
| 7,405,660 B2 * | 7/2008 | Diorio | G06K 7/0008 |
| | | | 340/10.1 |
| 7,419,096 B2 | 9/2008 | Esterberg et al. | |
| 7,420,465 B2 | 9/2008 | Ritter | |
| 7,588,185 B2 | 9/2009 | Berquist et al. | |
| 7,679,512 B2 | 3/2010 | Vest et al. | |
| 7,791,451 B2 | 9/2010 | Lei et al. | |
| 7,864,869 B2 * | 1/2011 | Eroz | H03M 13/1137 |
| | | | 375/242 |
| 7,872,567 B2 * | 1/2011 | Friedrich | G06F 21/35 |
| | | | 340/10.1 |
| 7,873,767 B2 | 1/2011 | Moritani et al. | |
| 7,876,220 B2 | 1/2011 | Aldridge | |
| 8,174,369 B2 | 5/2012 | Jones et al. | |
| 8,332,656 B2 | 12/2012 | Jones et al. | |
| 8,938,615 B2 * | 1/2015 | Neill et al. | 713/176 |
| 2002/0185532 A1 * | 12/2002 | Berquist et al. | 235/385 |
| 2003/0033575 A1 * | 2/2003 | Richardson | G06N 3/02 |
| | | | 714/799 |
| 2003/0058958 A1 * | 3/2003 | Shokrollahi | H04L 1/0041 |
| | | | 375/295 |
| 2004/0220860 A1 | 11/2004 | Persky et al. | |
| 2004/0246103 A1 * | 12/2004 | Zukowski | G06F 21/79 |
| | | | 340/10.41 |
| 2005/0001719 A1 * | 1/2005 | Aupperle et al. | 340/539.13 |
| 2005/0024200 A1 * | 2/2005 | Lambright | G06K 17/0029 |
| | | | 340/539.1 |
| 2005/0193199 A1 * | 9/2005 | Asokan et al. | 713/168 |
| 2005/0275531 A1 * | 12/2005 | Johnson | G06K 7/0008 |
| | | | 340/539.22 |
| 2006/0061482 A1 * | 3/2006 | Monney et al. | 340/825.52 |
| 2006/0077034 A1 * | 4/2006 | Hillier | 340/5.61 |
| 2006/0087407 A1 | 4/2006 | Stewart et al. | |
| 2006/0170534 A1 | 8/2006 | Arneson et al. | |
| 2006/0176154 A1 * | 8/2006 | Littlechild et al. | 340/10.5 |
| 2006/0279412 A1 * | 12/2006 | Holland | G06K 17/00 |
| | | | 340/10.51 |
| 2007/0001006 A1 * | 1/2007 | Schuessler et al. | 235/451 |
| 2008/0011847 A1 * | 1/2008 | Silverbrook | G06Q 10/087 |
| | | | 235/435 |
| 2008/0040132 A1 | 2/2008 | Foth et al. | |
| 2008/0059659 A1 | 3/2008 | Moritani et al. | |
| 2008/0150702 A1 * | 6/2008 | Neill et al. | 340/10.42 |
| 2008/0181291 A1 * | 7/2008 | Zhou | H04B 7/1858 |
| | | | 375/227 |
| 2008/0197982 A1 | 8/2008 | Sadr | |
| 2009/0201131 A1 | 8/2009 | Delia et al. | |
| 2009/0216910 A1 * | 8/2009 | Duchesneau | G06F 9/5072 |
| | | | 709/250 |
| 2010/0172502 A1 | 7/2010 | Jones et al. | |
| 2012/0212331 A1 | 8/2012 | Jones et al. | |

FOREIGN PATENT DOCUMENTS

| | | |
|---|---|---|
| JP | 2002240952 | 8/2002 |
| JP | 2003196617 A | 7/2003 |
| JP | 2006018396 A | 1/2006 |
| JP | 2006185391 A | 7/2006 |
| WO | 2005006244 A1 | 1/2005 |

OTHER PUBLICATIONS

Supplementary European Search Report for Application No. EP 08713655, Search Completed Nov. 16, 2012, 5 pgs.

\* cited by examiner

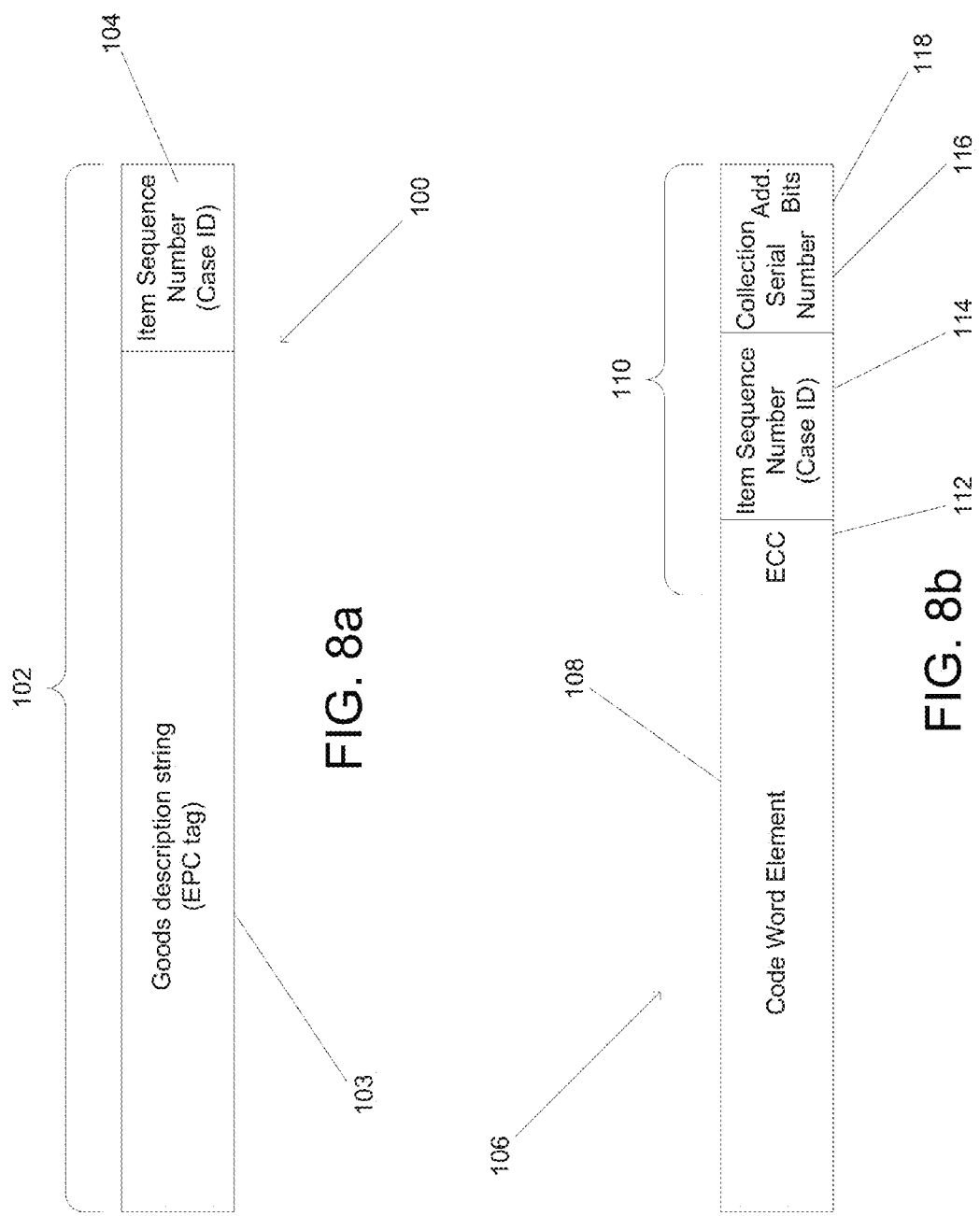

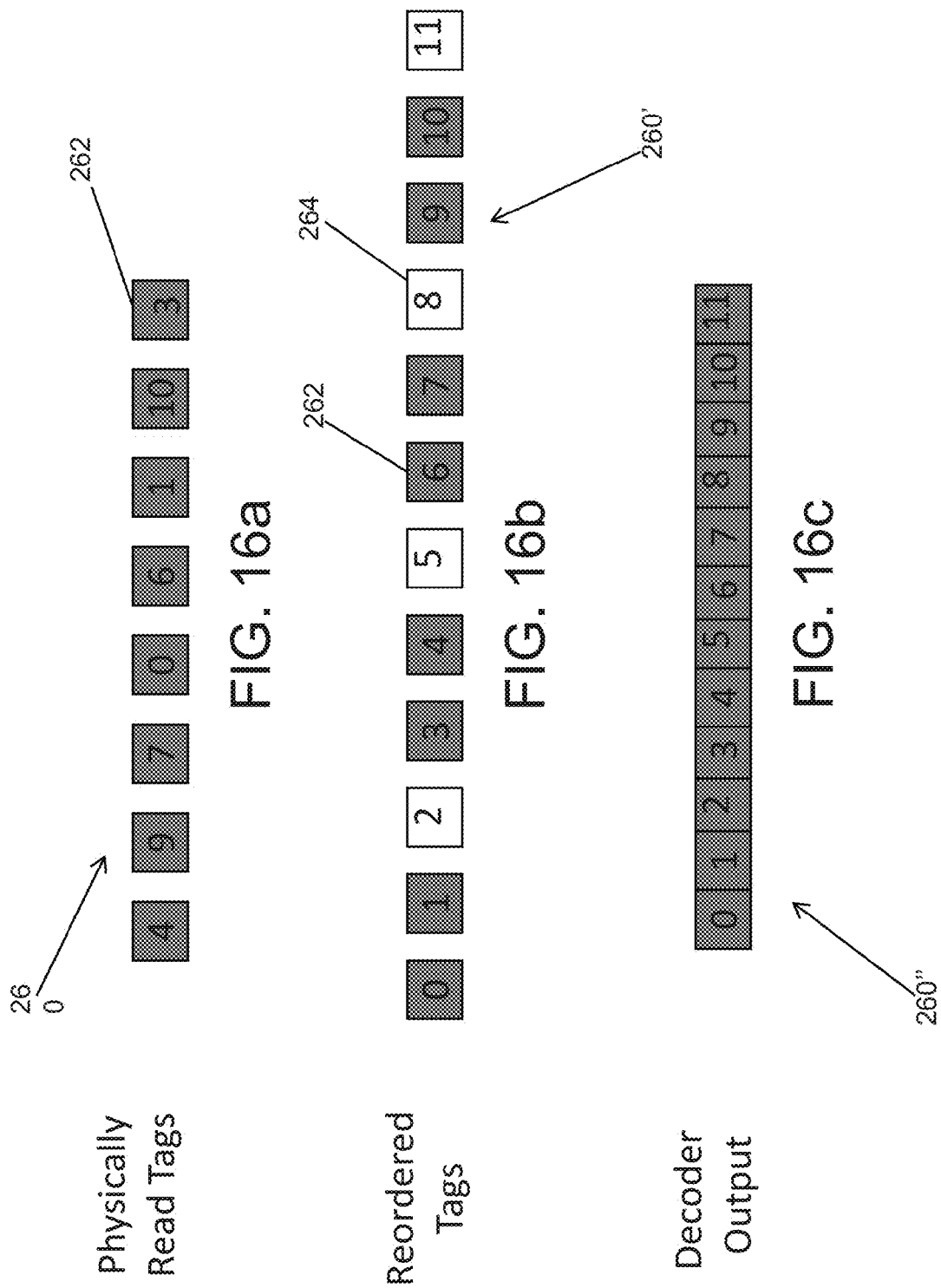

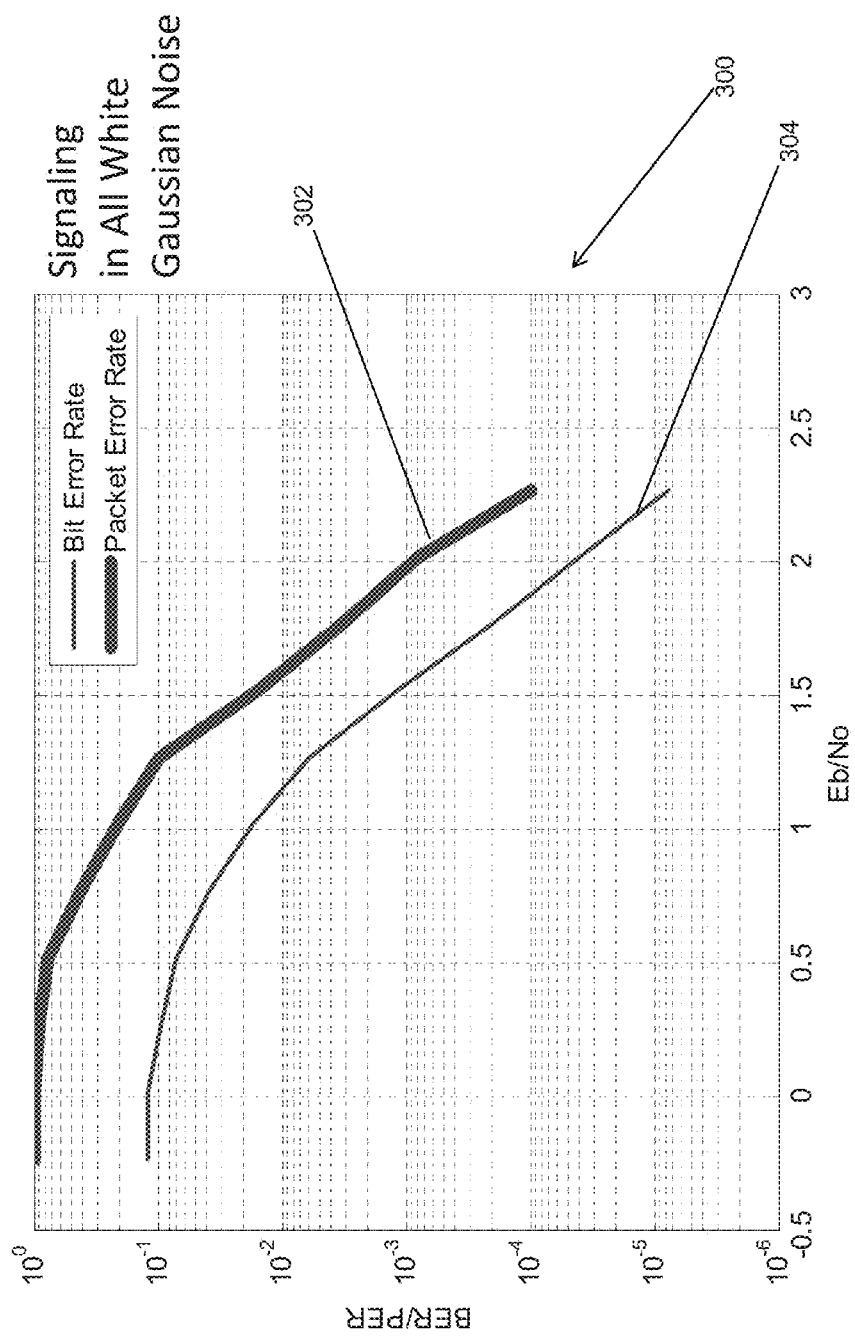
FIG. 18 - Error Rate Performance Rate 1/3 T=24, N=20 Length 1440 Code Word Element

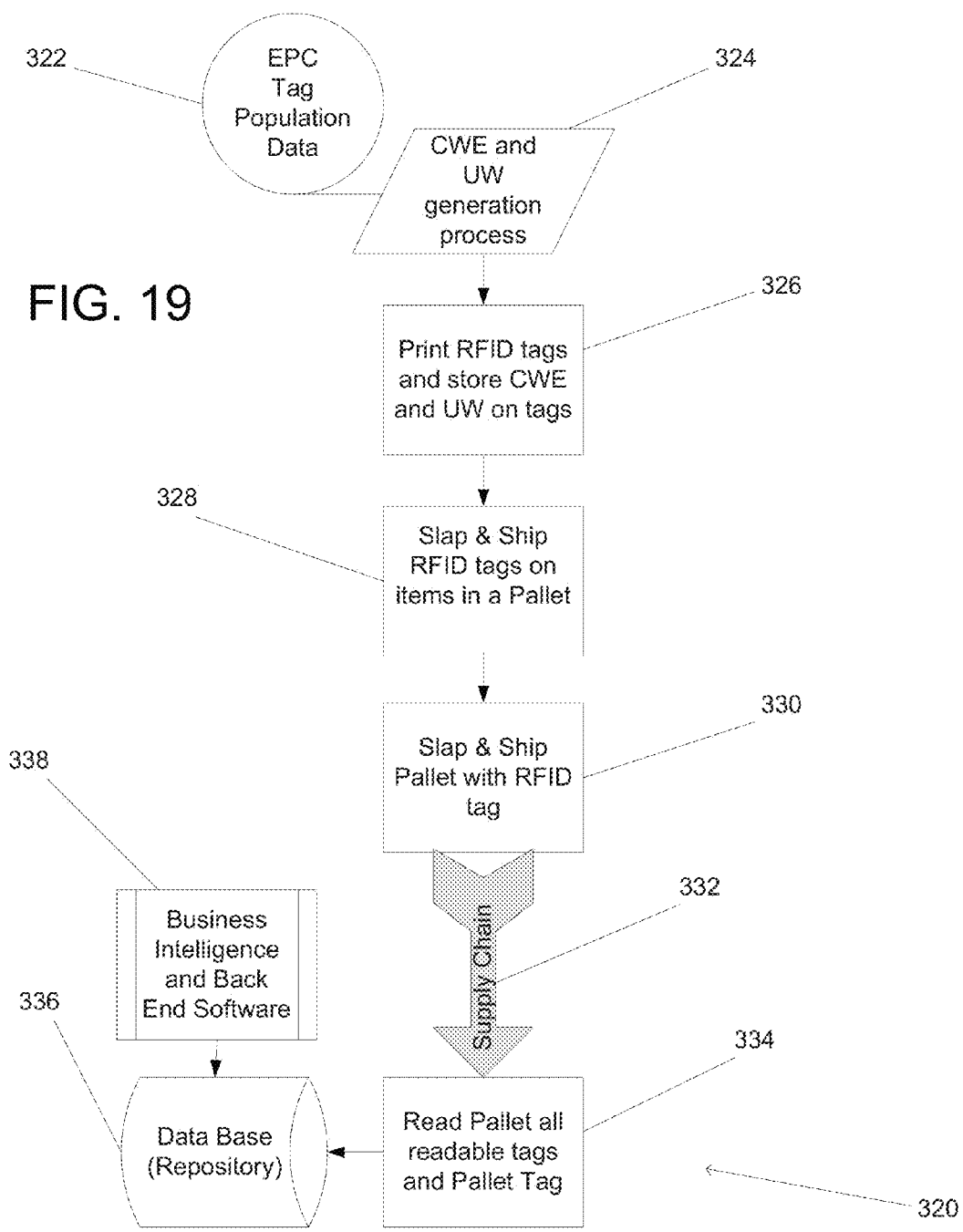

SYSTEMS AND METHODS FOR SECURE SUPPLY CHAIN MANAGEMENT AND INVENTORY CONTROL

CROSS-REFERENCE TO RELATED APPLICATIONS

This application is a continuation of U.S. patent application Ser. No. 12/522,645 which application is a continuation application of U.S. patent application Ser. No. 11/947,474 filed Nov. 29, 2007, which application claims the benefit of U.S. Provisional Application No. 60/884,197 filed Jan. 9, 2007 and U.S. Provisional Application Ser. No. 60/978,346 filed Oct. 8, 2007, the disclosures of which are expressly incorporated by reference herein in its entirety.

BACKGROUND

The present invention relates generally to Radio Frequency Identification (RFID) and more specifically to the encoding of RFID tags with information concerning a collection of items.

In a conventional supply chain, goods are transported between locations in collections such as palettes of goods. An individual item is often grouped and then re-grouped as it moves through the supply chain. Information concerning goods as they move through a supply chain can be valuable in inventory control and for detecting potential points at which goods are being lost.

RFID tags can be used to identify goods as they move through a supply chain. RFID systems allow information embedded in RFID tags to be manipulated wirelessly. RFID tags are typically categorized as being passive (i.e. having no internal power supply), active (i.e. having an internal power supply), or semi-passive (i.e. having a power source to power a microprocessor only). In supply chain management applications, at various waypoints in a supply chain, a good's RFID tag may be read as the good is re-grouped at each stage of the chain, prior to reaching its ultimate destination. When a group of goods is formed, the RFID tags affixed to the goods can be considered a population of RFID tags.

Conventional RFID systems attempt to read all RFID tags that can be energized. Laws of physics typically prevent achieving a 100% read rate of a population of RFID tags at all times. The causes of failure are often related to the propagation environment surrounding each RFID tag in the population or propagation impairments. For example, tags in the middle of a pallet may not be energized sufficiently; the orientation of the tag can prevent a successful read due to the in-lay; mortality of tags can render a tag unreadable; or high RF attenuation due to the product material (e.g. metal or liquid) can shield the tags from a reader.

A shortcoming of many conventional RFID systems is that there is no way of establishing when every RFID tag in a population of RFID tags has been read. This contrasts the case of bar code readers where operators hear "a beep" which indicates a successful tag read. There is no such mechanism available today in RFID systems. The term "verifiability" can be used to imply the ability to detect the presence of an entire population of RFID tags with or without having physically read each tag in the population.

An additional challenge of many RFID applications relates to so-called "cross-reads". Cross reads arise when one population of tags is illuminated with energy and RFID tags from another, unintended, population respond. Since electromagnetic energy moves freely in space, there is no way to prevent wave propagation into unintended areas of interest.

SUMMARY OF THE INVENTION

Systems and methods are described for encoding and reading RFID tags of collections of items. In many embodiments, the encoding strings used to encode individual RFID tags are generated using information identifying all of the items in the collection. The encoding strings can also contain error correction code to enable the recovery of information from RFID tags that could not be read. In several embodiments, the encoding of the RFID tags provides verifiability. In a number of embodiments, the encoding of the RFID tags includes manifest information and is secured to enable electronic proof of delivery. Embodiments of the invention can be utilized in conjunction with RFID tags that are passive, active and/or semi-passive. Embodiments of the invention can also be utilized with any distributed or three dimensional memory system including three dimensional wireless memory systems such as RFID tags.

One embodiment of the invention includes a plurality of items, where each item possesses an item identifier string and a plurality of RFID tags, where an RFID tag is affixed to each of the items and each RFID tag is encoded with a code word element generated using at least all of the item identifier strings. In many embodiments, the items are a plurality of cases, pallets or containers.

In a further embodiment of the invention, a subset of the code word elements contain information indicative of all of the item identifier strings.

In another embodiment of the invention all of the code word elements form a code word that includes information indicative of all of the item identifier strings and error correction code.

In a still further embodiment, the code word further comprises manifest information.

In still another embodiment, the information indicative of all of the item identifier strings is a compressed set of item identifier strings, where the set of item identifier strings is formed from the item identifier strings of all of the items in the collection.

In a yet further embodiment, the error correction code is derived by applying error correction coding to the information indicative of all of the item identifier strings.

In yet another embodiment, the information indicative of all of the item identifier strings is encrypted.

In a further embodiment again, the code word is interleaved in accordance with an interleaver defined by a pseudo-random key.

In another embodiment again, the pseudo-random key is encrypted using an encryption key.

In a further additional embodiment, each item identifier string includes an item sequence number for the item and each RFID tag includes the item sequence number of the item to which the RFID tag is attached in addition to the code word element.

In another additional embodiment, the collection possesses a collection serial number and the RFID tag on each item in the collection includes the collection serial number in addition to a code word element and an item sequence number.

In a still yet further embodiment, each RFID tag is encoded with error correction information, where the error correction information enables correction of errors when reading the item sequence number and the collection serial number from the RFID tag.

Still yet another embodiment includes an antenna configured to generate a signal capable of encoding an RFID tag, a processor in communication with the antenna, a memory in communication with the processor, where the memory contains item identifier strings for a collection of goods. In addition, the processor is configured to generate a code word using at least the item identifier strings and the processor is configured to extract a code word element from the code word and direct the antenna to generate a signal capable of encoding an RFID tag with the code word element.

In a still further embodiment again, the memory also contains manifest information and the processor is configured to generate the code word using at least the item identifier strings and the manifest information.

In still another embodiment again, the processor is configured to compress the item identifier strings, generate error correction code using the compressed item identifier strings and generate the code word using at least the compressed item identifier strings and the error correction code.

In a still further additional embodiment, the processor is configured to encrypt the compressed item identifier strings and the error correction code.

In still another additional embodiment, the processor is configured to interleave the compressed item identifier strings and the error correction code in accordance with a pseudo-random key and to encrypt the pseudo-random key.

In a yet further embodiment again, each item identifier string includes an item sequence number, the memory contains a collection serial number, the processor is configured to generate a unique word using at least the item sequence number and the collection serial number, and the processor is configured to direct the antenna to generate a signal capable of encoding an RFID tag with the code word element and the unique word.

In yet another embodiment again, the processor is configured to generate an error correction code using the item sequence number and the collection serial number, and generate a unique word using at least the item sequence number, the collection serial number and the error correction code.

A yet further additional embodiment, includes an RFID tag reader configured to read information from a plurality of RFID tags, and a processor configured to receive information from the RFID tag reader, store information from RFID tags that possess collection serial numbers that match the collection serial number of the collection and discard information from other RFID tags. In addition, the processor is also configured to reorder the code word elements in accordance with the item sequence numbers of the RFID tags from which the code word elements were read, the processor is also configured to create a code word using the code word elements, and the processor is also configured to extract item identifier sequences using the code word.

In yet another additional embodiment, the processor is further configured to extract manifest information from the code word.

In a further additional embodiment again, the processor is configured to recover code word elements from RFID tags that could not be read using error correction information included in the code word elements that were read.

In another additional embodiment again, the processor is configured to decrypt the complete set of code word elements.

In a still yet further embodiment again, the processor is configured to decrypt a pseudo-random key and deinterleave the complete set of code word elements using the pseudo-random key.

In still yet another embodiment again, the processor is configured to extracting an item sequence number from each item identifier string and match the extracted item sequence number against the item sequence number of each RFID tag.

In a still yet further additional embodiment, the processor is configured to construct a record of the item identifier string corresponding to each RFID tag.

In still yet another additional embodiment, the processor is configured to store in the memory the code word elements of RFID tags known to have been removed from an inventory, read RFID tags believed to be in inventory, identify RFID tags believed to be in inventory that were not read, and locate the item identifier string corresponding to the missing RFID tag within the record of the item identifier strings that corresponding to each RFID tag.

An embodiment of the method of the invention includes creating a set of identifier strings using the item identifier strings of all of the items in the collection, generating a code word using at least the set of identifier strings, breaking the code word into a number of code word elements equal to the number of items in the collection and using each code word element to encode a separate RFID tag.

In a further embodiment of the method of the invention, the code word is generated using at least the set of identifier strings and manifest information.

In another embodiment of the method of the invention, generating a code word using the set of identifier strings further includes compressing the set of identifier strings and adding error correction code to the compressed set of item identifier strings.

In a still further embodiment of the method of the invention, generating a code word using the set of identifier strings further includes encrypting the compressed set of identifier strings and error correction code.

In still another embodiment of the method of the invention, generating a code word using the set of identifier strings further includes interleaving the compressed set of identifier strings and error correction code using an interleaver defined by a pseudo-random key.

A yet further embodiment of the method of the invention further includes encrypting the pseudo-random key.

Yet another embodiment of the method of the invention also includes assigning a serial number to the collection of items and encoding each RFID tag with a unique word generated using at least the serial number of the collection of items and an item sequence number included in the item identifier string of the item for which the RFID tag is produced.

In a further embodiment again of the method of the invention, the unique word further comprises error correction code.

Another embodiment again of the method of the invention includes reading the code word element, collection serial number and item sequence number from a plurality of memories, discarding the code word element from memories that bear a collection serial number that does not match the serial number of the collection, reordering the remaining code word elements in accordance with the item sequence numbers read from the memories, forming a code word using the ordered code word elements, extracting a set of item identifier strings from the code word, and identifying the items in the collection using each of the item identifier strings.

A further additional embodiment of the method of the invention also includes extracting manifest information from the code word.

In another additional embodiment of the method of the invention, forming a code word using the ordered code word elements, includes recovering code word elements from memories that were not read using error correction information included in the code word elements that were read.

In a still yet further embodiment of the method of the invention, forming a code word using the ordered code word elements, further includes decrypting the complete set of code word elements.

In still yet another embodiment of the method of the invention, forming a code word using the ordered code word elements, further includes decrypting a pseudo-random key and deinterleaving the complete set of code word elements using the pseudo-random key.

In a still further embodiment again of the method of the invention, identifying the items in the collection using each of the identifier strings further includes extracting an item sequence number from each item identifier string, and matching the extracted item sequence number against the item sequence number read from each memory.

Still another embodiment again of the method of the invention further includes constructing a record of the item identifier string corresponding to each item.

A still further additional embodiment of the method of the invention further includes tracking an inventory by constructing a code word that combines the code word elements read from the memories affixed to items in the inventory with stored code word elements associated with items known to have been removed from inventory.

Still another additional embodiment of the method of the invention further includes identifying items missing from inventory by identifying items believed to be in inventory that were not read and using the record of the item identifier string corresponding to each item to identifying the specific item that is missing.

In still yet another further additional embodiment again of the method of the invention, each memory is part of a separate RFID tag.

BRIEF DESCRIPTION OF DRAWINGS

FIG. 8a is a conceptual illustration of an item identifier string that can be stored on a conventional EPC/ISO compliant RFID tag.

FIG. 8b is a conceptual illustration of a code word element in accordance with an embodiment of the invention.

FIGS. 16a-16c are conceptual illustrations of the reconstruction of a code word from code word elements read from RFID tags in a collection in accordance with an embodiment of the invention.

FIG. 18 is a chart showing error rate performance of a system in accordance with an embodiment of the invention that utilizes encoding strings generated using the rate 1/3 code shown in FIG. 14.

FIG. 19 is a flow chart showing a process for encoding and reading RFID tags of a collection of goods with code word elements including manifest information in accordance with an embodiment of the invention.

DETAILED DESCRIPTION OF THE INVENTION

Turning now to the drawings, systems for encoding and reading RFID tags on a collection of items are shown. A collection can include a case of items, a pallet of items and a container filled with items. In many embodiments, each item in a collection has an associated item identifier string. The encoding process involves generating a code word for the collection using the item identifier strings and dividing the code word into code word elements that are assigned to each item's RFID tag. In several embodiments, the code word includes error correction code. When an attempt is made to read the collection of RFID tags, only a portion of the RFID tags can typically be read and the error correction code is used to recover the code word elements encoded on the RFID tags that were not read. Once all of the code word elements have been read and/or recovered, the code word can be reconstructed and the item identifier strings for each item in the collection determined.

In many embodiments, redundancies in the item identifier strings are exploited to generate the code word. A code word in accordance with an embodiment of the invention can be generated by compressing the item identifier strings and appending error correction code to the compressed data. In a number of embodiments, information in addition to the item identifier strings is used in the generation of code words. For example, manifest information can be included in the code word. In many embodiments, the information contained in the code word is obfuscated using interleaving and/or secured using encryption. In many instances, the code word includes the same number or fewer bits than the concatenated item identifier strings.

In several embodiments, each RFID tag in a collection is also encoded with a unique word that includes an item sequence number. The item sequence number facilitates the reordering of code word elements. In many embodiments, the unique word also includes a collection serial number. The collection serial number enables a reader to discard code word elements read from a collection of RFID tags that the reader did not intend to read.

Supply Chains

Figure 1:
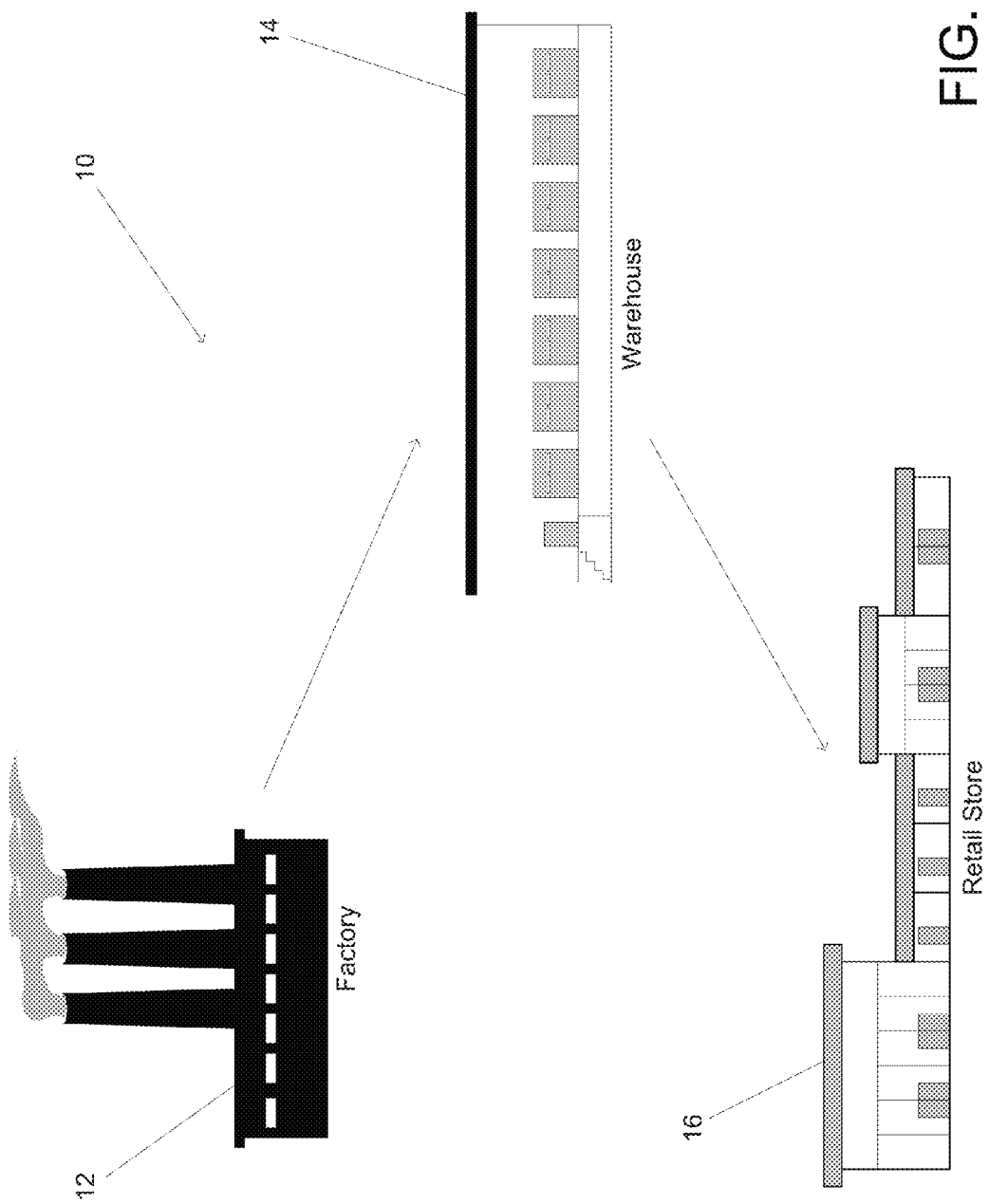
FIG. 1 is a conceptual illustration of items bearing RFID tags encoded in accordance with embodiments of the invention moving between a factory, warehouse and a retail store.

A supply chain in accordance with an embodiment of the invention is illustrated in FIG. 1. The supply chain 10 includes the movement of items between a factory 12, a warehouse 14 and a retail store 16. At various stages through the supply chain, items are grouped into collections and each item in the collection is tagged with an RFID tag encoded in accordance with an embodiment of the invention so that information concerning all of the items in the collection can be recovered from a subset of the RFID tags in the collection. As the collections move from one location to another, RFID readers attempt to interrogate each of the RFID tags in the collection. The RFID readers are typically only able to read information from a portion of the RFID tags in the collection. However, the information encoded on the RFID tags that were read contains information concerning all of the items in collection.

The supply chain shown in FIG. 1 is quite simple. Embodiments of the invention can be used in any supply chain including supply chains that are considerably more complex, involving movement of collections between multiple warehouses and/or items that originate from sources other than factories.

Figure 2:
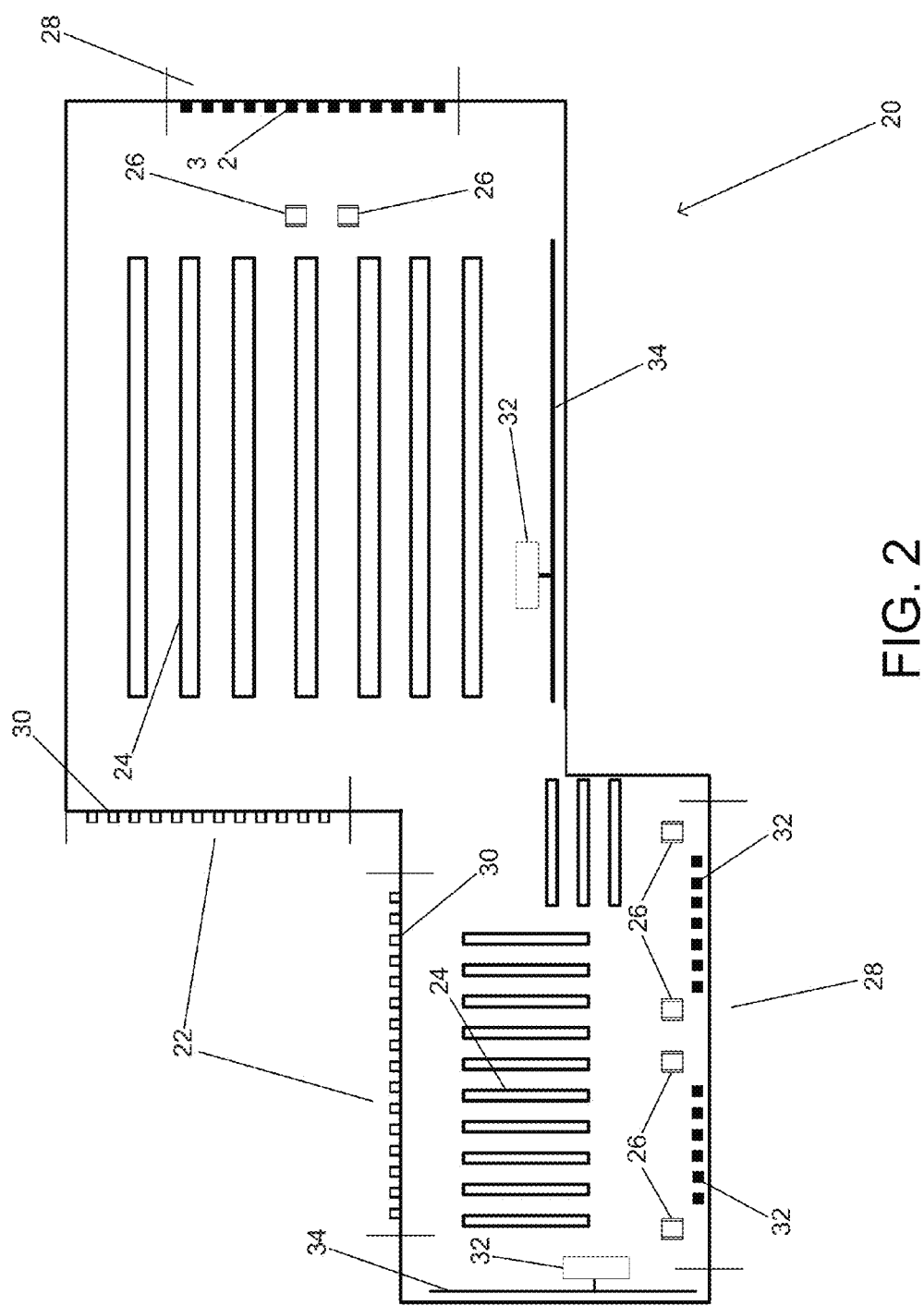
FIG. 2 is a floor plan of a warehouse including RFID tag readers in accordance with embodiments of the invention.

The tracking of items as they move through a supply chain can be further appreciated by considering the warehouses and retail stores through which an item may pass on its way to an end user. A warehouse that includes RFID readers for tracking items entering, within and leaving the warehouse in accordance with an embodiment of the invention is illustrated in FIG. 2. Items typically enter the warehouse through receiving doors 22, are stored temporarily in storage shelves 24, before being formed into collections at pallet wrapping stations 26, and prior to being shipped out via the shipping doors 28. As items move through the warehouse, RFID tags affixed to the items can be interrogated to track the items. In addition, RFID tags can be fixed to the items or re-encoded as the items are added to collections. In many embodiments of the invention, the information encoded across the RFID tags of the entire collection includes information concerning every item in the collection and manifest information that can be secured via an interleaving and/or encryption process. In the illustrated embodiment, multiple interrogation spaces exist within the warehouse 20 including the receiving doors 22, the storage shelves 24, pallet wrapping stations 26 and the shipping doors 28. Mobile interrogation spaces can also exist such as forklifts equipped with interrogators and/or operators equipped with handheld devices. The variability in size of each interrogation space is realized via power control, that is the amount of excitation power that can be used to illuminate a desired range with the minimum range predicated by of RFID tags signal reception sensitivity, typically capped around −20 dBm for EPC Gen2 and ISO 18000-6 and the maximum range is dictated by regulatory constraint, which in the US is limited to around 4 Watts of power. The interrogation by readers in each interrogation space can be remotely controlled to read individual items and collections of items as they enter the warehouse, are moved throughout the warehouse and are formed into pallets and transported from the warehouse.

In the illustrated embodiment, the RFID reader system is composed of exciters 30 and readers 32. The readers are connected to a database via a network 34 and information obtained by the readers in accordance with embodiments of the invention can be used to maintain inventories of goods within the warehouse and to store manifests of items that have been received and shipped from the warehouse. In a number of embodiments, a reader system such as one of the reader systems described in U.S. patent application Ser. No. 11/553,951 entitled "RFID Receiver" to Ramin Sadr, filed Oct. 27, 2006 is used. In other embodiments, any RFID tag reader system capable of interrogating a collection of RFID tags can be used including systems that possess a single integrated exciter and reader. The disclosure of U.S. patent application Ser. No. 11/553,951 is incorporated herein by reference in its entirety.

Figure 3:
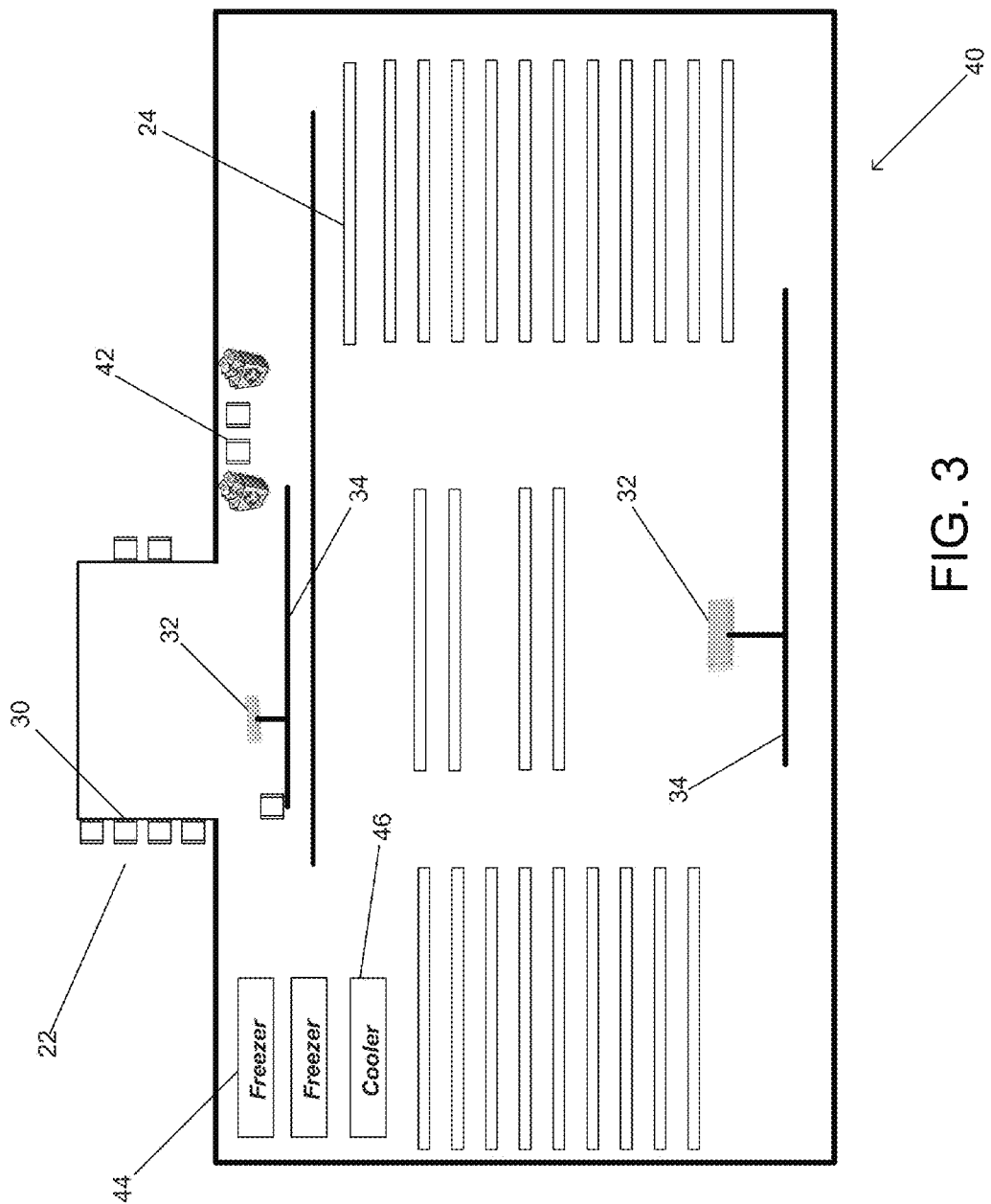
FIG. 3 is a floor plan of a retail store including RFID tag readers in accordance with embodiments of the invention.

A retail store including RFID readers for tracking items entering, within and leaving the retail store in accordance with an embodiment of the invention is illustrated in FIG. 3. Items typically enter the retail store on pallets via receiving doors 22. The pallets are broken down and items are removed from boxes at box crushing stations 42 and the items are moved to storage locations such as storage shelves 24, freezer storage 44, and refrigerated storage 46. Interrogating RFID tags of collections as they enter the retail store and as items are distributed throughout the store and are sold enables the tracking of inventory, the location of goods, and the detection of loss of goods. The retail store 40 includes interrogation spaces located at the receiving doors 22, box crushers 42, storage shelves 24, freezer storage 44 and refrigerated storage 46. In the illustrated embodiment, the RFID reader system is composed of exciters 30 and readers 32. The RFID readers are connected to a database via a network 34 and information obtained by the RFID readers can be used to maintain an inventory of items within the retail store.

Figure 4:
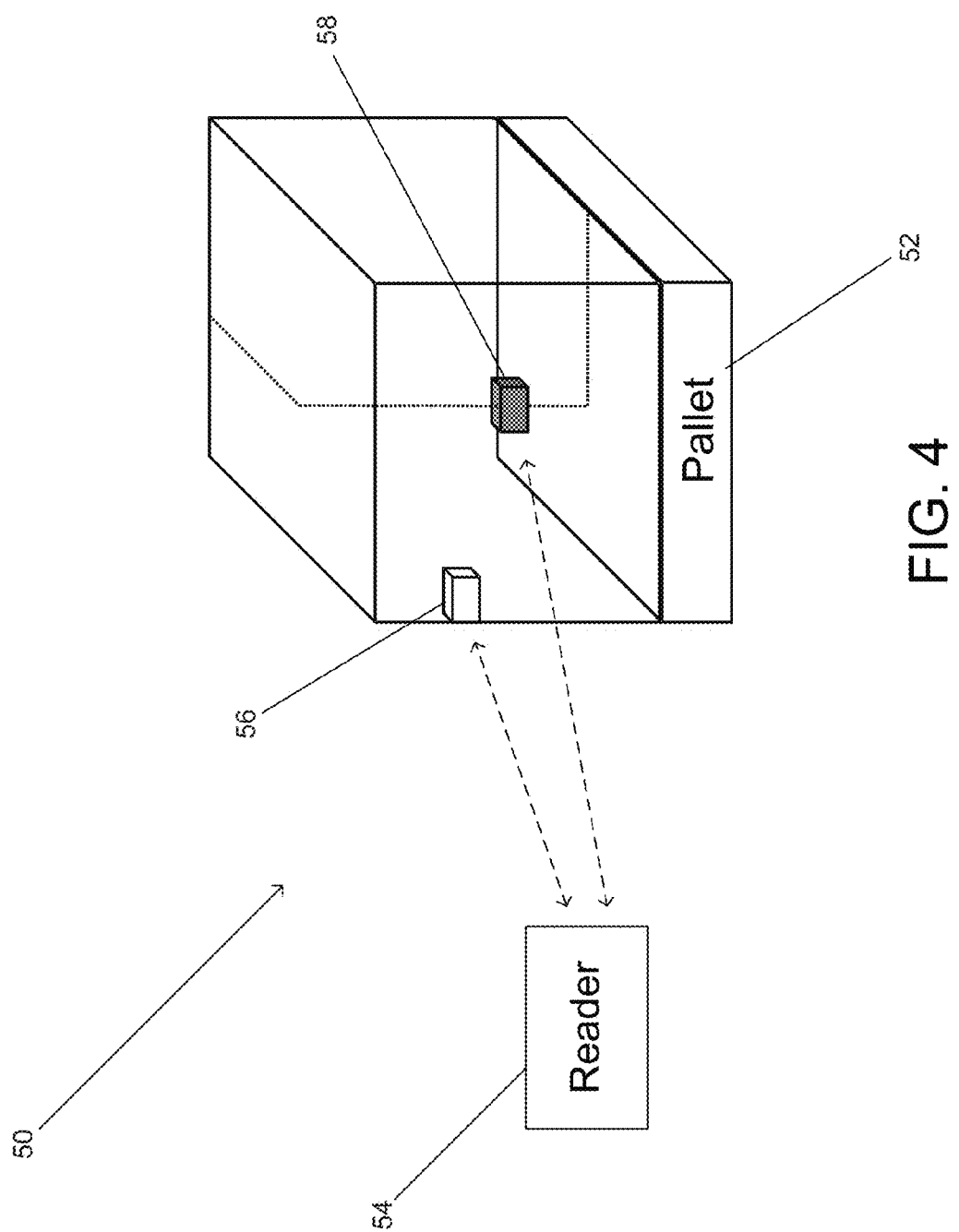
FIG. 4 is a conceptual illustration of an RFID reader reading information encoded on RFID tags affixed to items packaged into a pallet.

When a collection of items tagged with RFID tags encoded in accordance with an embodiment of the invention is read by an RFID reader at any point in the supply chain, the RFID reader is unlikely to read information directly from all of the RFID tags in the collection. The inability of an RFID reader to read all of the tags is illustrated in FIG. 4. An interrogation space containing a pallet of items being read by a reader in accordance with an embodiment of the invention is shown in FIG. 4. The interrogation space 50 includes a pallet of items 52. The pallet of items 52 includes a first item 56 that is located near the surface of the collection of items stacked on the pallet and a second item 58 located within the interior of the collection of items stacked on the pallet. In many embodiments, the reader is able to obtain RFID information from the first item and is not able to obtain RFID information from the RFID tag of the second item. The inability to read the RFID tag of the second item can be attributed to a number of factors. For example, the tags in the middle of the pallet cannot be energized sufficiently; the orientation of the tag can prevent a successful read due to the in-lay; mortality can render a tag unreadable; high RF attenuation due to multipath in indoor wireless propagation environment or RF coupling of the energy between the tag antenna and the product material (e.g. metal or liquid) can cause failure of receiving any signal from the tags from a reader. When each RFID tag is encoded in accordance with an embodiment of the invention, information from the RFID tags in a collection that could be read can be used to recover information from the RFID tags that could not be read.

Tracking Collections of Items

Figure 5:
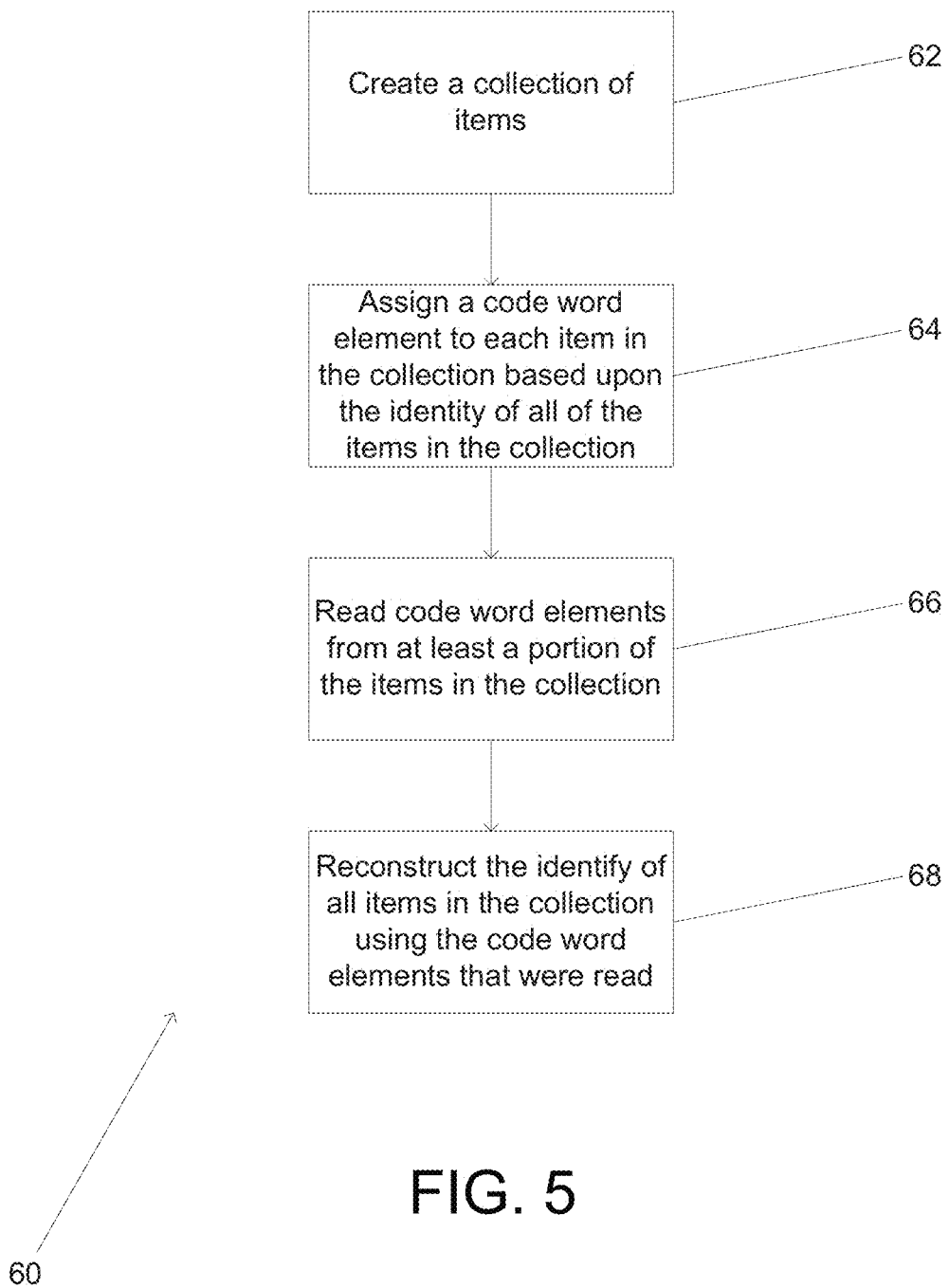
FIG. 5 is a flow chart showing a process for encoding RFID tags and reading information from RFID tags in accordance with an embodiment of the invention.

A supply chain process in accordance with an embodiment of the invention that involves encoding RFID tags and reading information from the RFID tags is shown in FIG. 5. The process 60 includes creating (62) a collection of items, assigning (64) a code word element to the RFID tag of each item in the collection based upon the identity of all of the items in the collection, reading (66) code word elements from the RFID tags of at least a portion of the items in the collection and reconstructing (68) the identity of all of the items in the collection using the code word elements that were read.

An important feature of code word elements in accordance with embodiments of the invention is that each code word element is generated using information that reflects the identity of all of the items in the collection. Effectively information concerning the entire collection is spread across the RFID tags of each item in the collection. In many embodiments, reading a single code word element from an item's RFID tag is insufficient information to ascertain the identity of the item bearing the RFID tag (or any other item in the collection). However, reading the code word elements from RFID tags of a sufficiently large subset of items in the collection enables the recovery of information concerning every item in the collection.

Generating Code Word Elements

Figure 6:
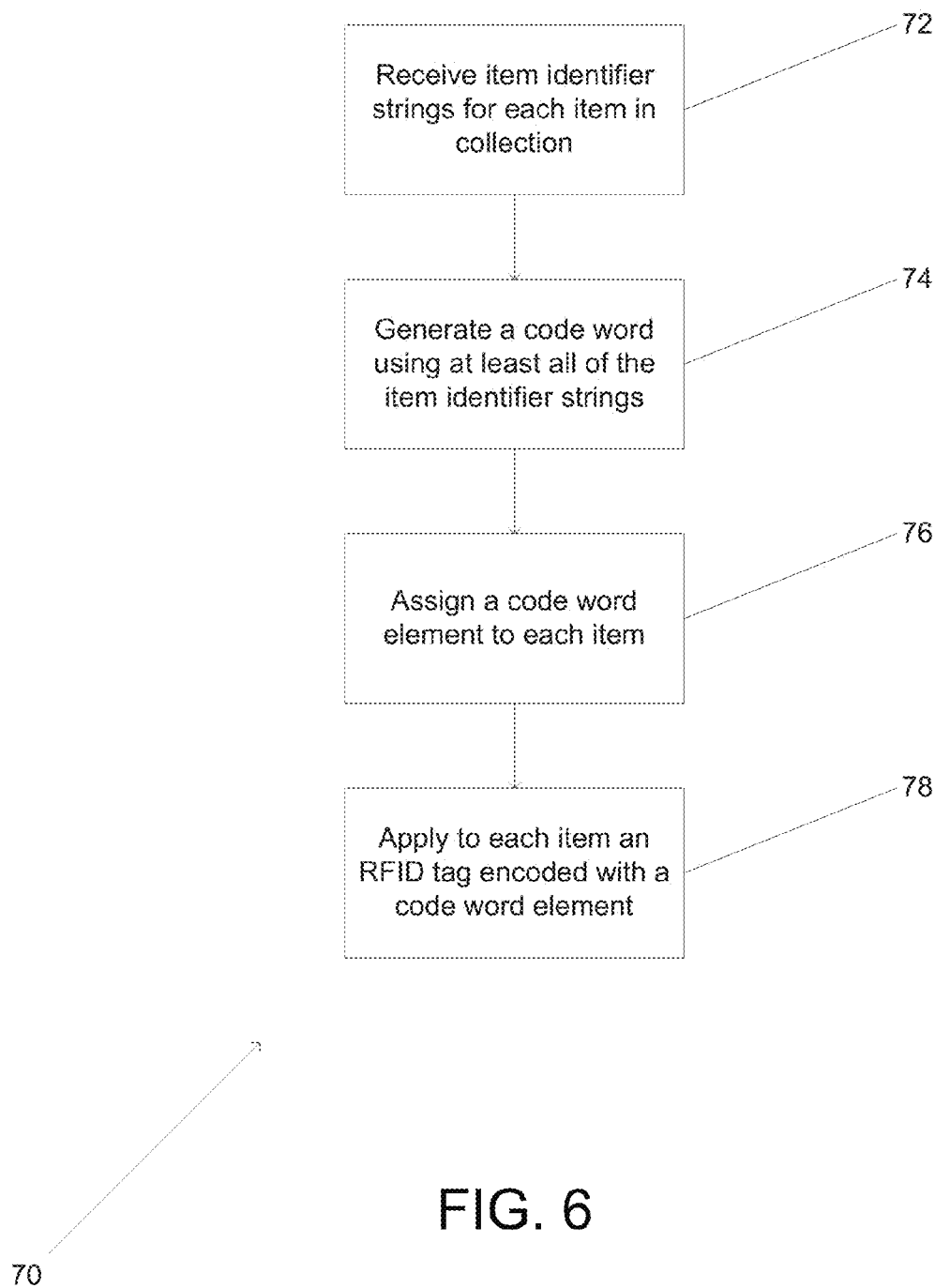
FIG. 6 is a flow chart showing a process for encoding RFID tags in accordance with an embodiment of the invention.

In a number of embodiments, each item in a collection is identified by an item identifier string and the code word elements are generated using the item identifier strings for all of the items in the collection. A process for assigning code word elements to RFID tags in accordance with an embodiment of the invention is shown in FIG. 6. The process 70 includes receiving (72) item identifier strings for each item in the collection, generating (74) a code word using at least all of the item identifier strings, assigning (76) a code word element to each item and applying (78) to each item an RFID tag encoded with a code word element.

In the illustrated embodiment, the code word can be generated in any of a variety of ways that retains the information inherent in the item identifier strings. For example, a process for generating a code word in accordance with an embodiment of the invention can include lossless compression of the item identifier strings. In many embodiments, the code word includes error correction information to enable the recovery of all of the item identifier strings in the event that portions of a code word are lost or corrupted. In operation, a reader attempts to reconstruct the code word using code word elements read from RFID tags of items in a collection. When RFID tags cannot be read, gaps exist in the reconstructed code word that can be filled in using error correction code. The number of RFID tags that are required to be read in order to be able to reconstruct the code word typically depends upon the rate of the error correction code.

Figure 7A:
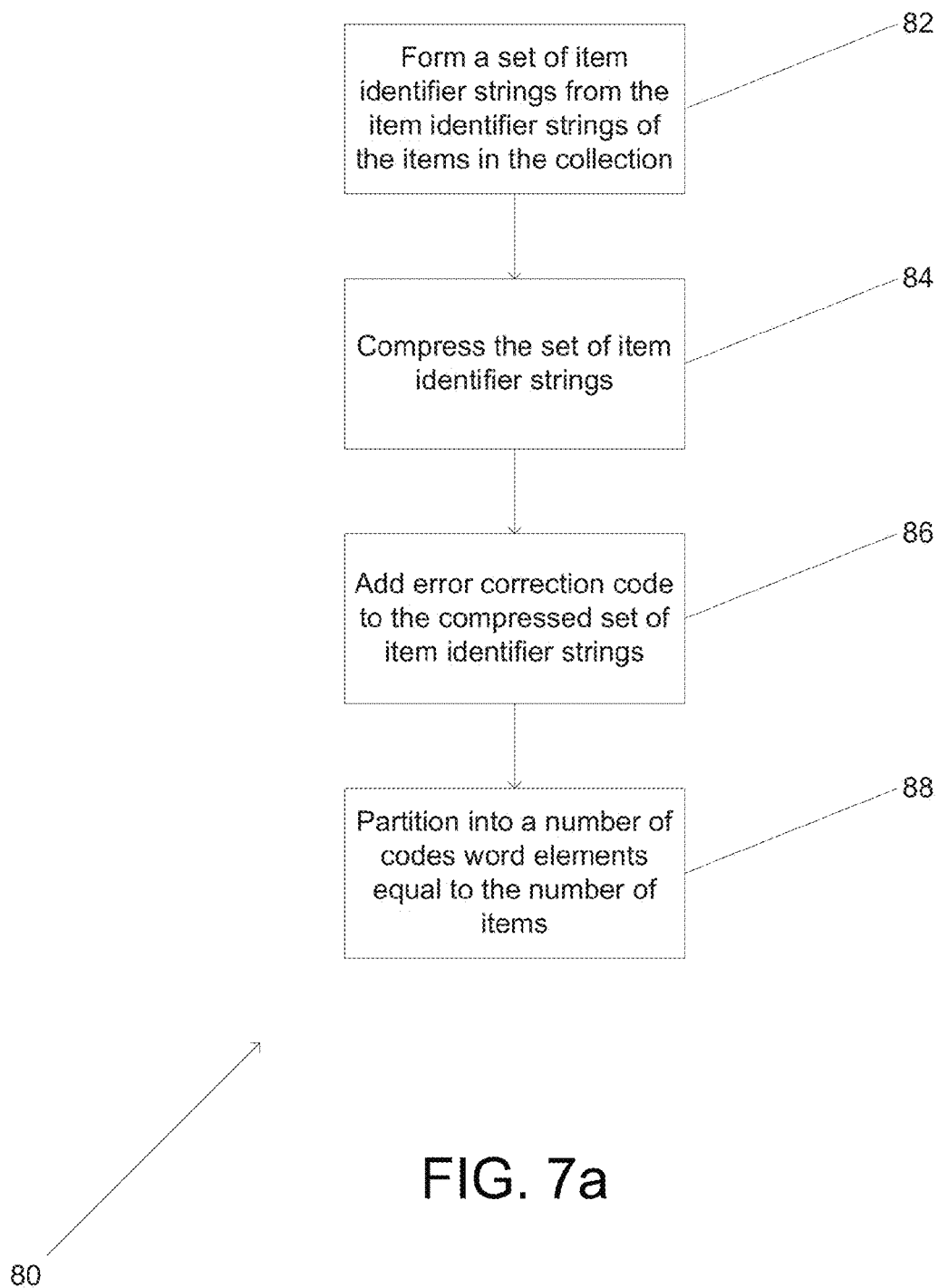
FIGS. 7a & 7b are flow charts showing processes generating code word elements in accordance with embodiments of the invention.

A process for generating a code word in accordance with an embodiment of the invention is shown in FIG. 7a. The process 80 includes forming (82) a set of item identifier strings using the item identifier strings of all of the items in the collection. The set of item identifier strings is then compressed (84) and error correction code is added (86) to the compressed set of item identifier strings to generate a code word. The code word is then partitioned (88) into a number of code word elements equal to the number of items. In many embodiments, the set of item identifier strings is formed by concatenating the item identifier strings of each item in the collection. In several embodiments, the compression and the error correction coding methods are chosen to achieve code word elements that are the same size or smaller than the item identifier strings. In other embodiments, any of a variety of compression and error correction codes can be used.

In many embodiments, the RFID tags are encoded with information concerning a collection of items in a way that prevents unauthorized access to the information. In a number of embodiments, a code word is generated and one or more of a variety of encryption and obfuscation techniques is applied to the code word prior to the generation of the code word elements. The encryption and/or obfuscation of the code word reduces the likelihood that someone obtaining access to the code word elements can recover the code word. In other embodiments, one or more encryption and/obfuscation processes are applied to each of the code word elements individually to generate the information used to encode the RFID tags of items in a collection. In other embodiments, other methods for securing information concerning items in a collection can be used including, but not limited to, the use of a proprietary process for mapping item identifier strings to a code word.

Securing Information Concerning a Collection

Figure 7B:
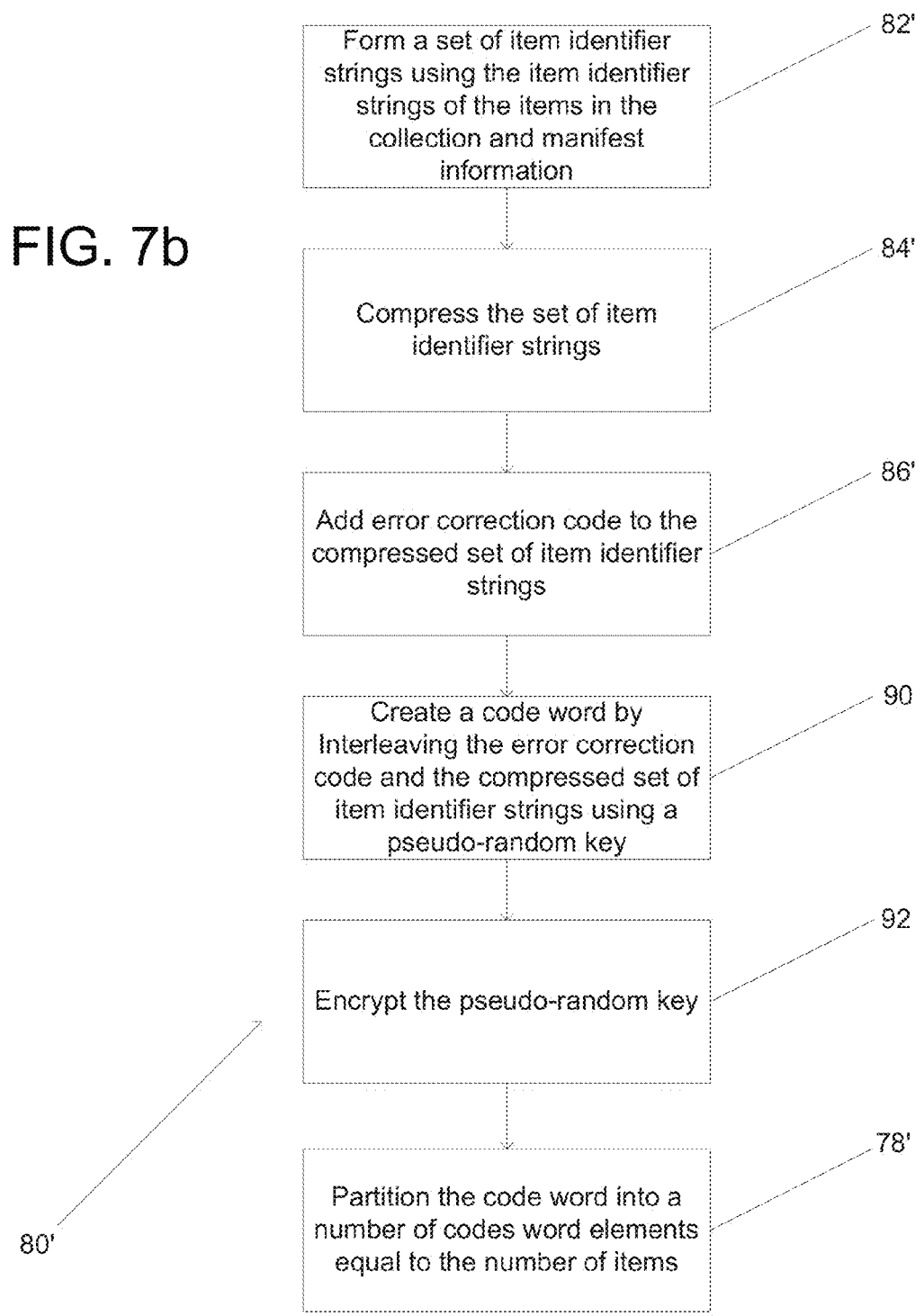

An embodiment of a process for encoding RFID tags using an obfuscated code word in accordance with an embodiment of the invention is shown in FIG. 7b. The process 80' includes forming (82') a set of item identifier strings. The set of item identifier strings is compressed (84') and error correction code is appended (86') to the compressed item identifier strings. An obfuscated code word is formed by interleaving (90) the error correction code and the compressed set of item identifier strings. In many embodiments, the interleaver is configured using a pseudo-random key and the pseudo-random key is encrypted (92). In several embodiments, the encrypted key is appended to the code word and the code word is partitioned (78') into a number of code word elements equal to the number of items in a collection. In other embodiments, the code word does not include the encrypted pseudo-random key. In a number of embodiments, the encrypted pseudo-random key is encoded on a collection RFID tag that can be affixed to a palette or other container or item that is transported with the collection. In many embodiments, the encrypted key is transported by other means including via email or another form of electronic communication.

Item Identifier Strings

Much of the above discussion assumes the existence of a set of item identifier strings that describe each item in a collection of goods. Item identifier strings can be derived in many different ways. In a number of applications a standardized set of item identifier strings is desirable. For example, many supply chains use item identifier strings derived in accordance with a specification such as the Electronic Product Code (EPC) specifications developed by the Massachusetts Institute of Technology Auto ID Center of Cambridge, Mass. In other embodiments, other standards can be used for specifying the item identifier strings.

A typical item identifier string is illustrated in FIG. 8a. The item identifier string 102 includes a first sequence of bits that constitute a goods description string 103 and second sequence of bits that constitute an item sequence number 104 or Case ID. The goods description string 103 is often a non-unique string that is used to simply describe an item. The item sequence number is a number that is unique to the item within the collection of items. In many embodiments, the item sequence number is not unique across all collections of items.

Generating Encoding Strings

As discussed above, item identifier strings similar to those shown in FIG. 8a are used to generate code word elements that are used as at least part of an encoding string to encode an RFID tag. An encoding string in accordance with an embodiment of the invention is shown in FIG. 8b. The encoding string 106 includes a code word element 108 derived in accordance with an embodiment of the invention and a unique word 110. In a number of embodiments, the unique word 110 includes an item sequence number 114 that is identical to the item sequence number of an item identifier string. Including item sequence numbers in the encoding string enables the matching of item identifier strings recovered from the code word elements with specific RFID tags. As will be discussed further below, the ability to match item identifier strings with specific RFID tags can facilitate inventory control for specific items in addition to the tracking of collections of items. In several embodiments, the unique word 110 also includes a collection serial number. The collection serial number is a number that is capable of uniquely identifying the collection of items. In a number of embodiments, the collection serial number is capable of uniquely identifying a collection of items within an organization. The collection serial number enables a reader to discard code word elements from RFID tags that were accidently read from items adjacent a collection. In the illustrated embodiment, the unique word 110 of the encoding string 106 also includes error correction code that can be used by a reader to correct errors in the item sequence number and/or the collection number and additional bits that can be reserved for other purposes.

Generating Unique Words

Figure 9:
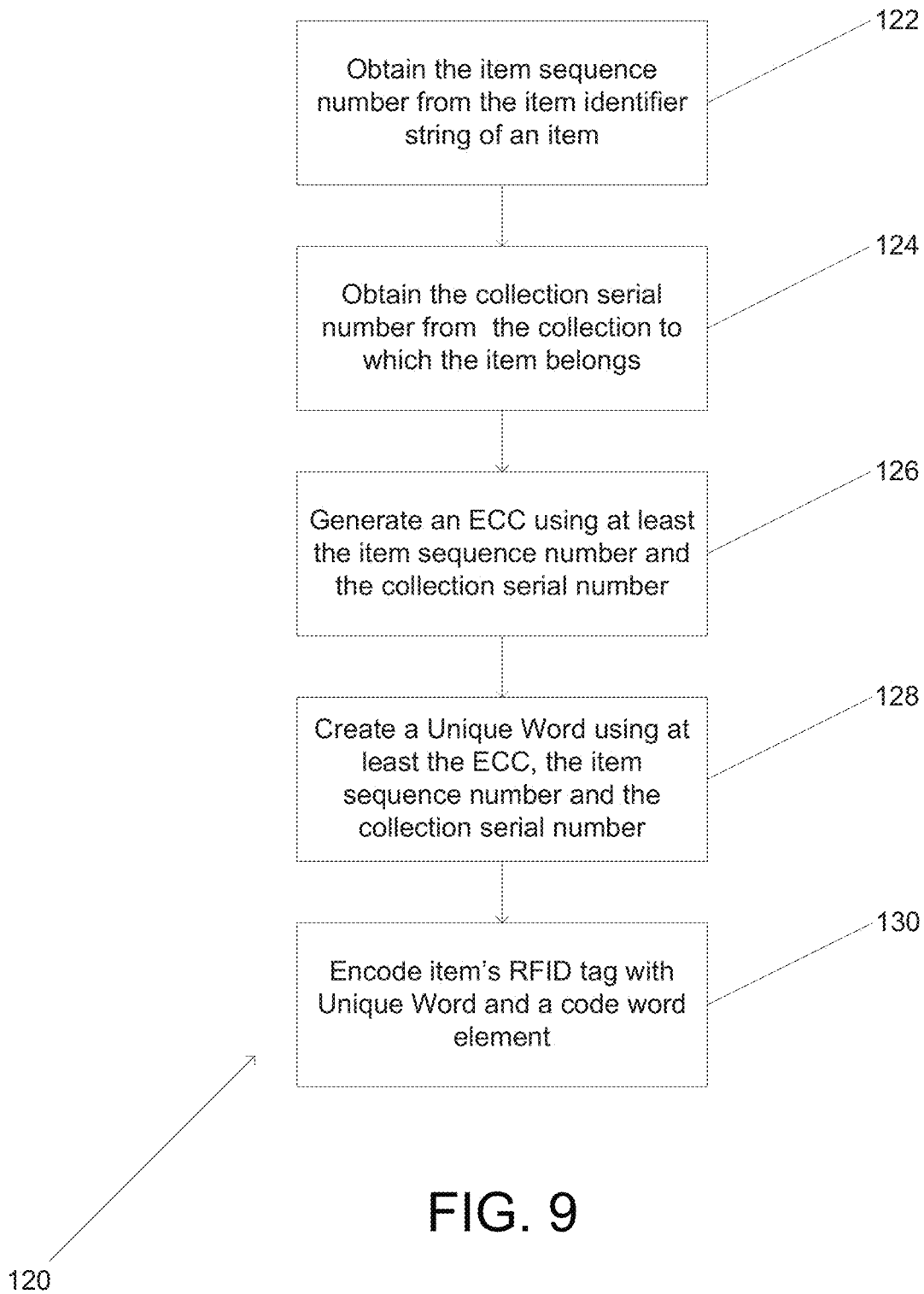
FIG. 9 is a flow chart showing a process for generating a unique word for an item in accordance with an embodiment of the invention.

A process for generating a unique word in accordance with an embodiment of the invention is shown in FIG. 9. The process 120 includes obtaining (122) an item sequence number from the item identifier string of an item and obtaining (124) a collection serial number for the collection to which the item belongs. Error correction code is generated (126) using the item sequence number, the collection serial number and any additional information that may be desirable to include in a unique word. A unique code word is then generated (128) using the error correction code, the item sequence number, the collection serial number and the additional information (if any) and encoded (130) onto an RFID tag along with a code word element.

Encoding Collection of Items within an EPC Framework

Figure 10:
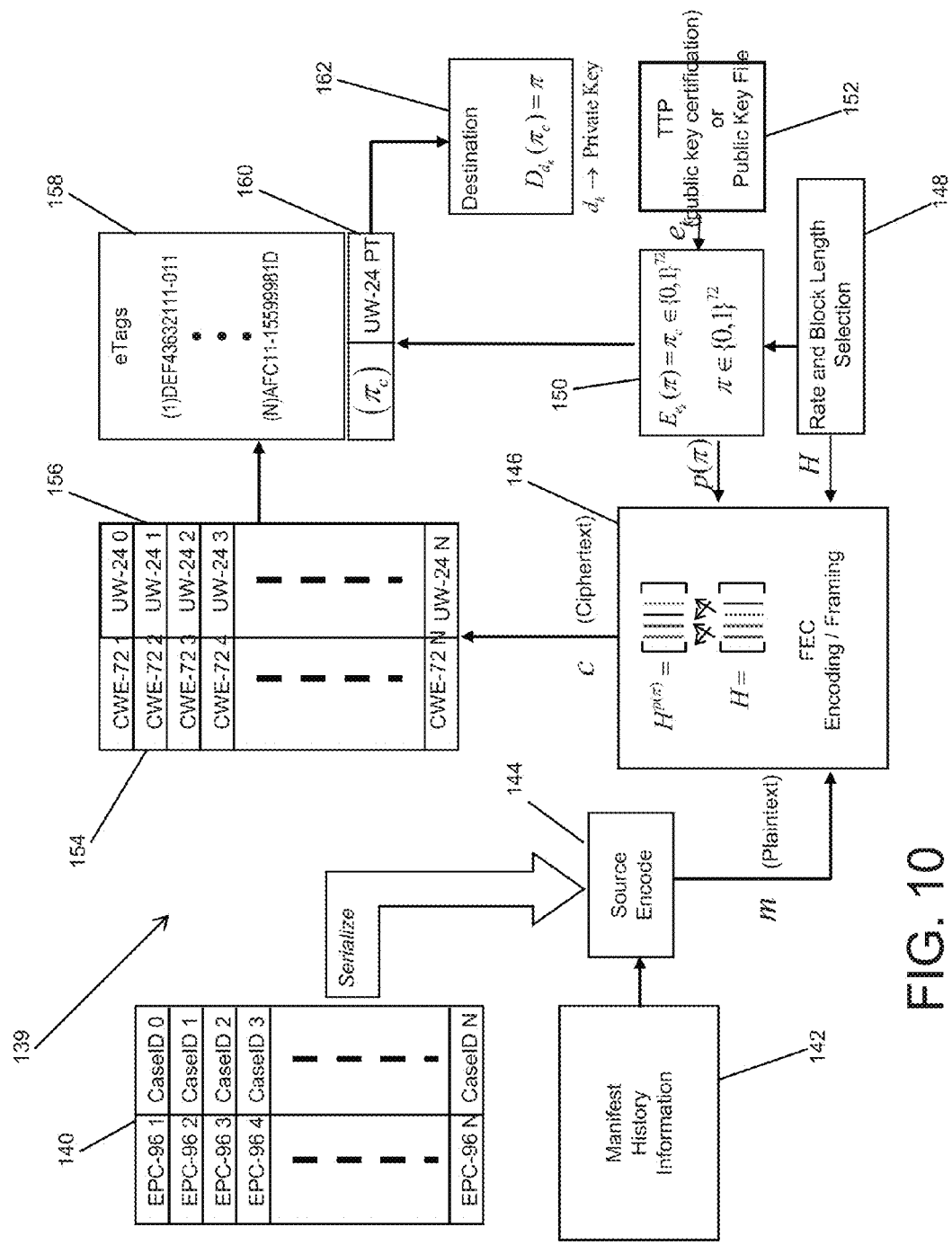
FIG. 10 is a semi-schematic diagram of a system for generating code word elements in accordance with an embodiment of the invention.

A software application for generating encoding strings using EPC v.1.3. compliant item identifier strings in accordance with an embodiment of the invention is conceptually illustrated in FIG. 10. The software application 139 receives a list 140 of N item identifier strings associated with items in a collection, such as merchandize cases on a pallet. Each item identifier string contains an EPC general identifier sequence that is 96 bits and is identifiable by a Case ID. The Case ID is a 9-bit number giving a physical tag assignment ID associated with each EPC general identifier sequence. As discussed above, these 9-bit Case ID's are item sequence numbers that will be matched one-to-one to a field in the unique word of each encoding string. Case ID's and unique words are physically associated with the case in both item identifier string and the encoding string. By decoding the code word elements in the manner outlined above, the original EPC General Identifier and the adjacent Case ID's can be mapped back to tags of origin by matching the recovered Case ID with the Case ID in the unique word of an item's encoding string.

The software application 139 is configured to serialize the list of item identifier strings and may append additional information to the serialized list. In a number of embodiments, the additional information includes manifest information 142 can be added to the data stream at the input to the source encoder 144 component of the software application. Manifest information is data in addition to the N item identifier strings that a distribution center might want to embed in a collection, such as a pallet of goods. Examples include: time/location of pallet construction, intended destination of pallet, etc. The item identifier strings and the manifest information uniquely identify the collection.

In the illustrated embodiment, there is substantial redundancy across the list of item identifier strings and manifest information. The source encoder 144 compresses at least the (96+9)N bits of item identifier string information into something much less than 96N bits. In many embodiments, the manifest information is also compressed. There are many possible source compression algorithms that can be used by the source encoder 144 to perform noiseless source coding of the original item identifier strings and manifest information. In many embodiments, Huffman codes, arithmetic codes or universal source coding methods are used. In a number of applications, a source encoding technique is chosen that provides a good compromise between compression performance and throughput.

The software application performs Forward Error Correction (FEC) encoding 146 on the compressed bits. In the illustrated embodiment, the FEC encoding expands the information bits back to a total of 72N bits. The total number of resulting information bits (m) depends on the data compression efficiency and determines the code rate and block length when generating error correction code. The determination criteria are discussed further below.

The information contained in the list of item identifier sequences and the manifest can be encrypted to ensure privacy and security. In one embodiment where an encryption/security mode is enabled, a random 72-bit binary string, $\pi$, is generated. This string seeds the generation 150 of a permutation of length 72N, $p(\pi)$. The permutation $p(\pi)$ is used to interleave the columns of the parity check matrix of the code, H, or equivalently to permute a generated code word to produce c (the ciphertext) in the FEC Encoder/Framer 146. The mechanism for generating $p(\pi)$ from $\pi$ and N is known publicly. Information concerning recovery of the code word is secured by encryption (150) the random binary string $\pi$ using a public key cryptograph (E) and a public key associated with destination k, $e_k$. In the illustrated embodiment, the resulting encrypted version of $\pi$, $\pi_c$, is also 72 bits long and is written to a collection RFID tag. Any copies of π are then destroyed to ensure security. In many embodiments, the collection RFID tag is fixed to a transportation container such as a pallet. In other embodiments, the pseudo-random string π is communicated to a reader via other means of communication including via a secure electronic means of communication. The destination private key $d_k$, is used by a reader 162 to recover π from $π_c$. The destination never reveals its private key to an un-trusted party. Public keys, $e_k$'s, may be openly available, or may be administrated (for the purpose of authentication) by a trusted third party (TTP) 152.

When a code word is generated (secure or otherwise), the software application 139 breaks the code word into code word elements. In the illustrated embodiment, the code word is 72N bits and each code word element is 72 bits. Every 72-bit code word element 154 is appended with the 24-bit unique word 156 to form a full 96-bit encoding string that can then be encoded onto an EPC/ISO compliant RFID tag.

In one embodiment, each unique word 156 includes a 2-error correcting Bose, Ray-Chaudhuri, Hocquenghem (BCH) code (n=24, k=14, $d_{min}$=5). The lower 9 bits of the 14 data bits are used as serial numbers (from 0 to N−1, N<512) to order physically read encoding strings prior to decoding. As discussed above, the serial number is typically the Case ID (i.e. item sequence numbers) assigned to the item bearing the RFID tag encoded with the encoding string. In many embodiments, the upper 5 bits are used to associate a collection serial number or serial ID with a particular collection. The collection serial number is used to guard against cross-pallet reads. A series of RFID tags is read by the reader in a given inventory round. Only RFID tags that possess a desired collection serial number are passed to the decoder. Also, since the unique word is not covered by the FEC code incorporated into the code word elements, the BCH code protects the 14-bit unique word content in the event that we wish to pass bit flipped as well as erased channel data to the decoder (in the nominal operating mode, tags must pass an EPC CRC check in order to be accepted).

Note that the process of converting item identifier strings to encoding strings "uniquifies" each RFID tag while maintaining backward compatibility with EPC formatted tags. Under EPC formatting, individual RFID tags within a collection may not be unique. This is an important claim of the present invention because it implies that eTags posses a serialization property that can be used to uniquely identify items.

Interleaver Design

The security of the code word generated by the software applications shown in FIG. 10 is dependent upon the use of an interleaver. In many embodiments, codeword interleaver p(π) is a permutation of the numbers in the set of integers {0 . . . 71} (note that there are 72! such permutations). This permutation is applied N times to each of the N length 72 subsections of the parity check matrix. The permutation p(π) can be derived by first constructing 7 linear feedback shift registers (LFSR), using for instance, the ternary polynomial $x^{127}+x+1$. The LFSR associated with this polynomial has 127 memory elements. The memory elements for the $i^{th}$ LSFR are initialized by circularly shifting the 72-bit random number π, i places to the left. After initialization, the output of the set of 7 LFSRs are concatenated to form a 7 bit number. In addition, the modulus 72 of this 7 bit number is applied. The resulting number is a pseudo random integer from the set {0 . . . 71}. A second such number is generated. These two numbers are then used to index an enumerated list initialized with the elements [0 . . . 71]. The indexed numbers are then swapped. The procedure is repeated a fixed number of times. The number of shuffle instance of the original ordered set ([0 . . . 71]) should be large enough such that the probability of a sequential run of length L approaches the probability of drawing L numbers sequentially from the set {0 . . . 71}. This probability is (72−L)!/72!

When an interleaver similar to the interleaver described above is used to secure a code word, the only piece of the system that must remain secret is the 72 bit binary string π. To this end, a public key ($e_k$) is used to encrypt π via application of the public key cipher $E_{e_k}(π)$ which produces $π_c$. This encrypted version of π ($π_c$) is written to a tag and given the unique word marker 'PT', which denotes 'Pallet Tag'. The destination reads this tag and applies decryption based on the private key ($d_k$) via the private key cipher $D_{d_k}(π_c)$. This yields π from which the parity check matrix interleaver p(π) can be derived, hence opening the collection of items for decoding by a variable constraint node processor (see below).

Figure 11:
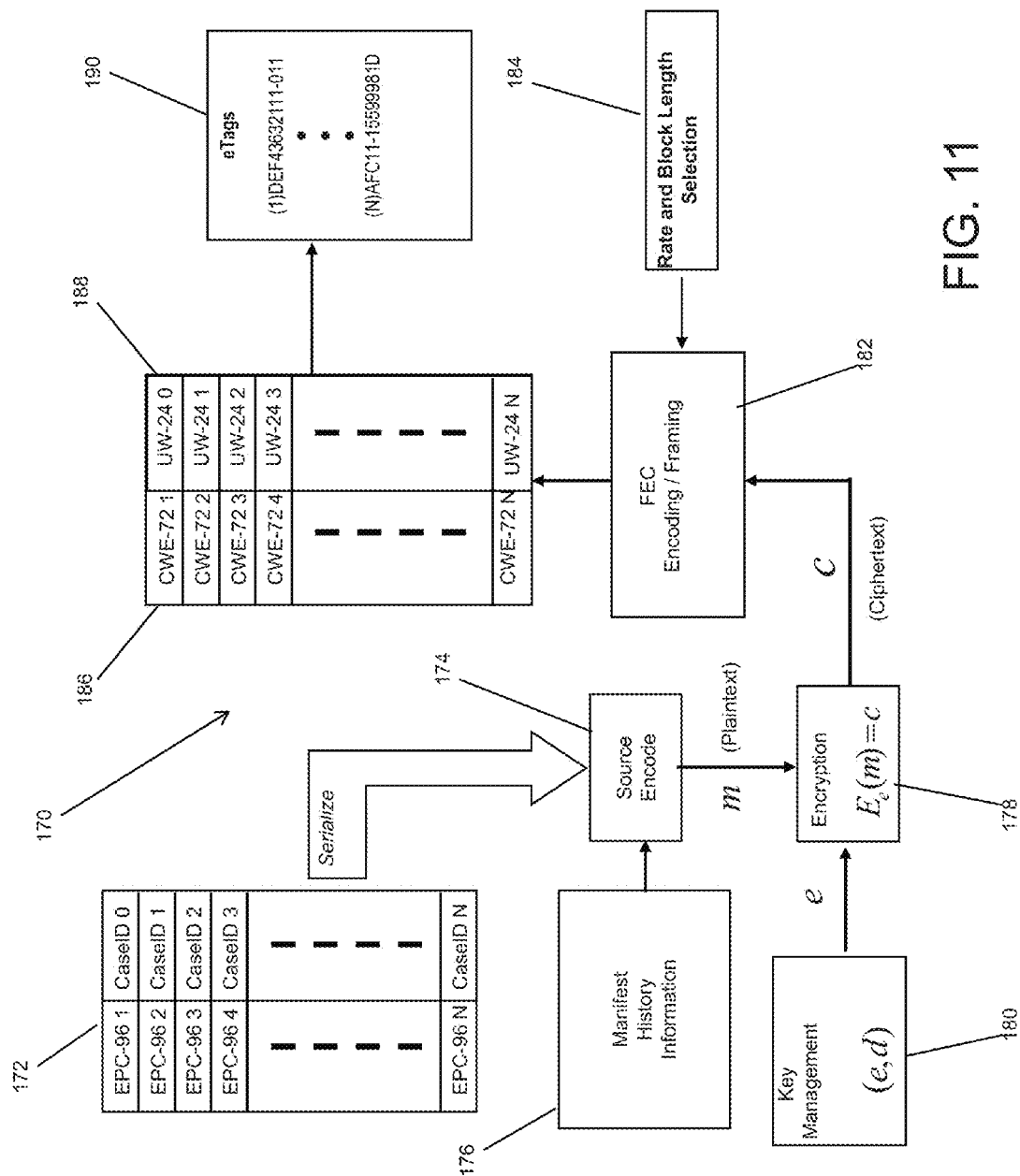
FIG. 11 is a semi-schematic diagram of a software application for generating code word elements in accordance with another embodiment of the invention.

Although a specific software application is shown in FIG. 10 any number of different processes in accordance with an embodiment of the invention can be used to generate code word elements and unique words using item identifier strings and other information. A software application in accordance with another embodiment of the invention that can be used to secure item identifier strings and additional information such as manifest information encoded onto the RFID tags of a collection of items is shown in FIG. 11. The principal differences between the software application 139 shown in FIG. 10 and the software application 170 shown in FIG. 11 is that public key encryption (178) is applied by the software application 170 shown in FIG. 11 after source encoding (174) only and a FEC interleaver is not utilized. Performing public key encryption on the output of the source encoder involves the generation (180) of variable length keys (or block-by-block concatenation of fixed length keys) that together form the public key. Another difference is that an encrypted permutation seed is communicated separately in the application shown in FIG. 10. The software application 170 shown in FIG. 15 does not require the communication of information to decipher the item identifier strings and/or the manifest information. Despite the differences between the software applications shown in FIGS. 10 and 11, both applications offer the same level of security since both rely on public-private key encryption to prevent eavesdropping.

Generating ECC Using an LDPC Code

Figure 12:
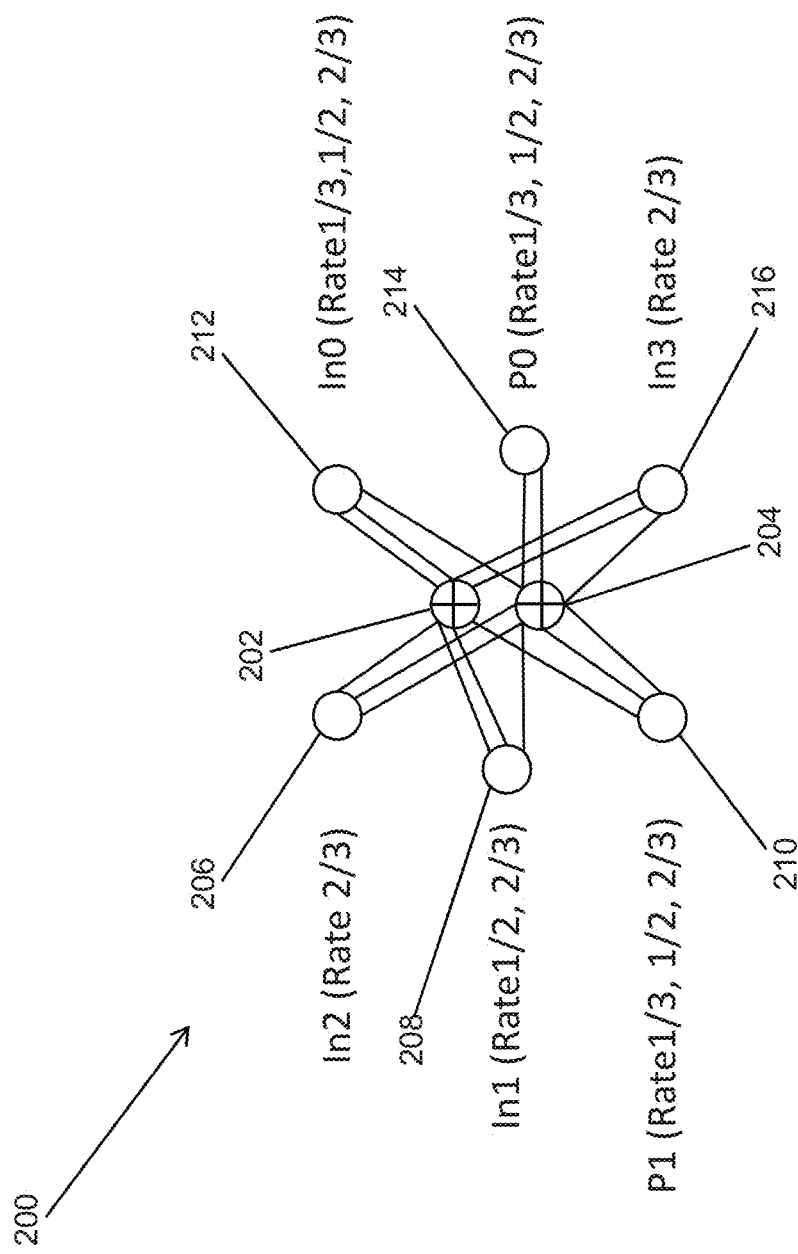
FIG. 12 is a conceptual illustration of a basic code structure for a low-density parity-check (LDPC) code in accordance with an embodiment of the invention.

Many of the embodiments described above include error correction code in a code word generated using item identifier strings and manifest information. Any of a variety of error correction coding techniques can be used. In many embodiments, a low-density parity-check (LDPC) code is used. A basic building block of a LDPC encoder in accordance with an embodiment of the invention is shown in FIG. 12. The basic building block 200 includes a plurality of variable nodes connected to a pair check nodes 202 and 204, which are exclusive-OR logical operations. The graph for the code is defined by connections between variable nodes and check nodes. Note that among the variable nodes, nodes labeled ln0 to ln3 (206, 208, 212, 216) represent possible input information variable nodes and nodes labeled P0 and P1 (210, 214) represent parity variable nodes. The connections between variable and check nodes are as follows: variable node 212 connects to check node 204 once and check node 202 two times; variable node 208 connects to check node 204 once and check node 202 two times; variable node 206 connects to check node 202 once and check node 204 two times; variable node 216 connects to check node 204 once and check node 202 two times; variable node 214 connects to check node 204 two times; and variable node 210 connects to check node 202 once and check node 204 two times.

In the illustrated embodiment, the LDPC code builds upon a basic code structure 200 with codeword length up to six bits applicable to three code rates (i.e. rate 2/3, rate 1/2 and rate 1/3). In this structure, there are up to four information bits represented by In0 to In3 and 2 parity bits represented by P0 and P1. The four information bit case is for rate 2/3. For code rates 1/3 and 1/2, there are two parity bits and one or two information bits respectively. The equations for the two check nodes are represented by the connections to the exclusive-OR symbols 202 and 204.

Figure 13:
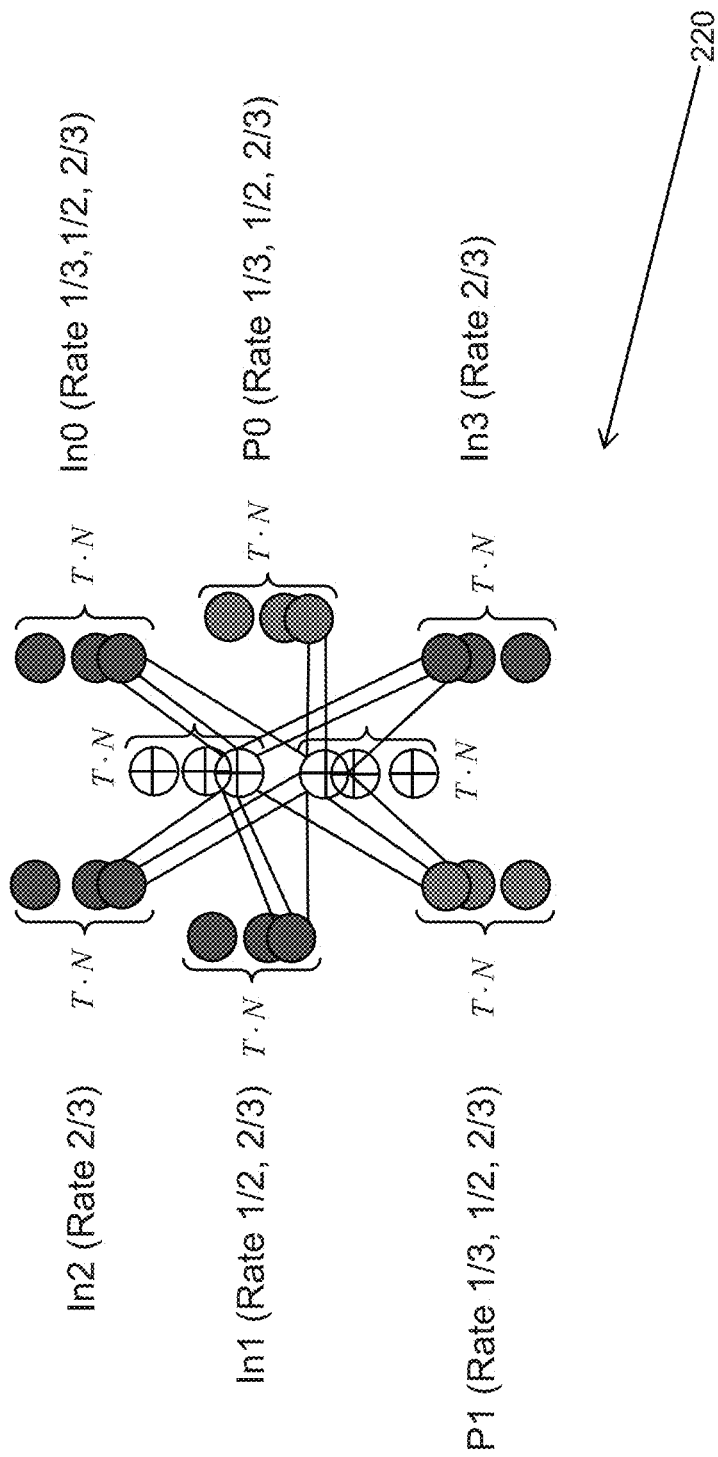
FIG. 13 is a conceptual illustration of the codes structure of an LDPC encoder in accordance with an embodiment of the invention.

The code structure of a full LDPC encoder in accordance with an embodiment of the invention that can be used in the generation of 72 bit code word elements is shown in FIG. 13. The LDPC encoder 220 includes the basic code structure repeated T times (where T is 24, 18, 12 for rates 1/3, 1/2, 2/3 respectively) to realize a base code whose length equals 72. This base code is then replicated by circulant permutations of size N, where N is an input parameter and is typically equal to the number of items in a collection. The process involves replacing any given edge in the bipartite graph of the replicated LDPC basic code structure (or a '1' in the corresponding parity check matrix) with a shifted identity matrix of size N. This practice is well known in the coding community. The combination of these two steps yields a parity check matrix for the code whose total length equals 72N for all rates. For example, the following table shows that a code appropriate for erasure protecting a pallet of size N=20 with a rate 2/3 code can be constructed by repeating the basic code structure 200 shown in FIG. 12 T=12 times and then repeat the resulting structure 20 times. This would yield a code with 4TN+2TN=6(12)(20)=1140 bits. Note that 1140=72×20.

TABLE 1

Number of copies of basic code structure and resulting information and parity bits for different LDPC codes rates.

| Rate | T (Copies) | Info (bits) | Parity (bits) |
|------|------------|-------------|---------------|
| 1/3  | 24         | (T)(N)      | 2(T)(N)       |
| 1/2  | 18         | 2(T)(N)     | 2(T)(N)       |
| 2/3  | 12         | 4(T)(N)     | 2(T)(N)       |

Selection of the code rate can be based on the total number of bits after source encoding and can be determined in accordance with the following expression.

$$\left\lceil \frac{TotBits}{N} \right\rceil \begin{cases} 24 & \text{Rate} = 1/3 \\ 36 & \text{Rate} = 1/2 \\ 48 & \text{Rate} = 2/3 \end{cases}$$

Where, Totbits=length(c), and
N=the number of items/RFID tags

Asymptotic (in block length) threshold analysis of the above code shows that the code can provide performance close to the Shannon limit (for each rate) as block length tends to infinity.

Figure 14A:
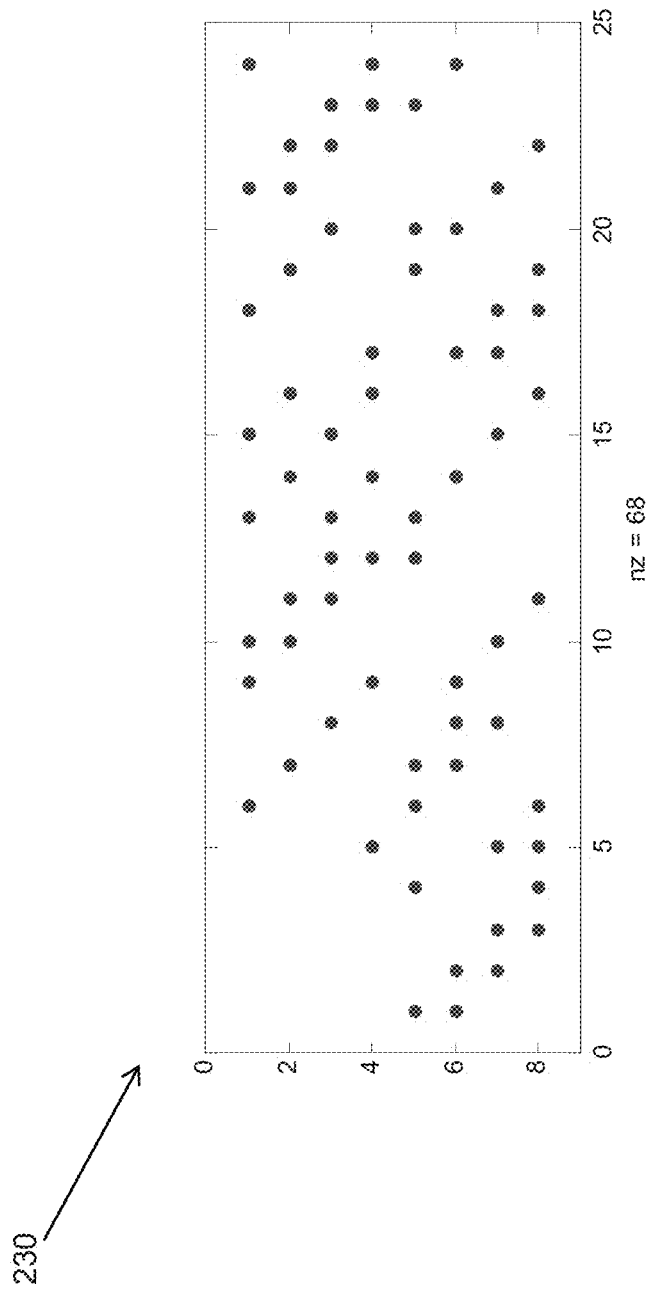
FIG. 14a is a view of a parity matrix in accordance with an embodiment of the invention.
Figure 14B:
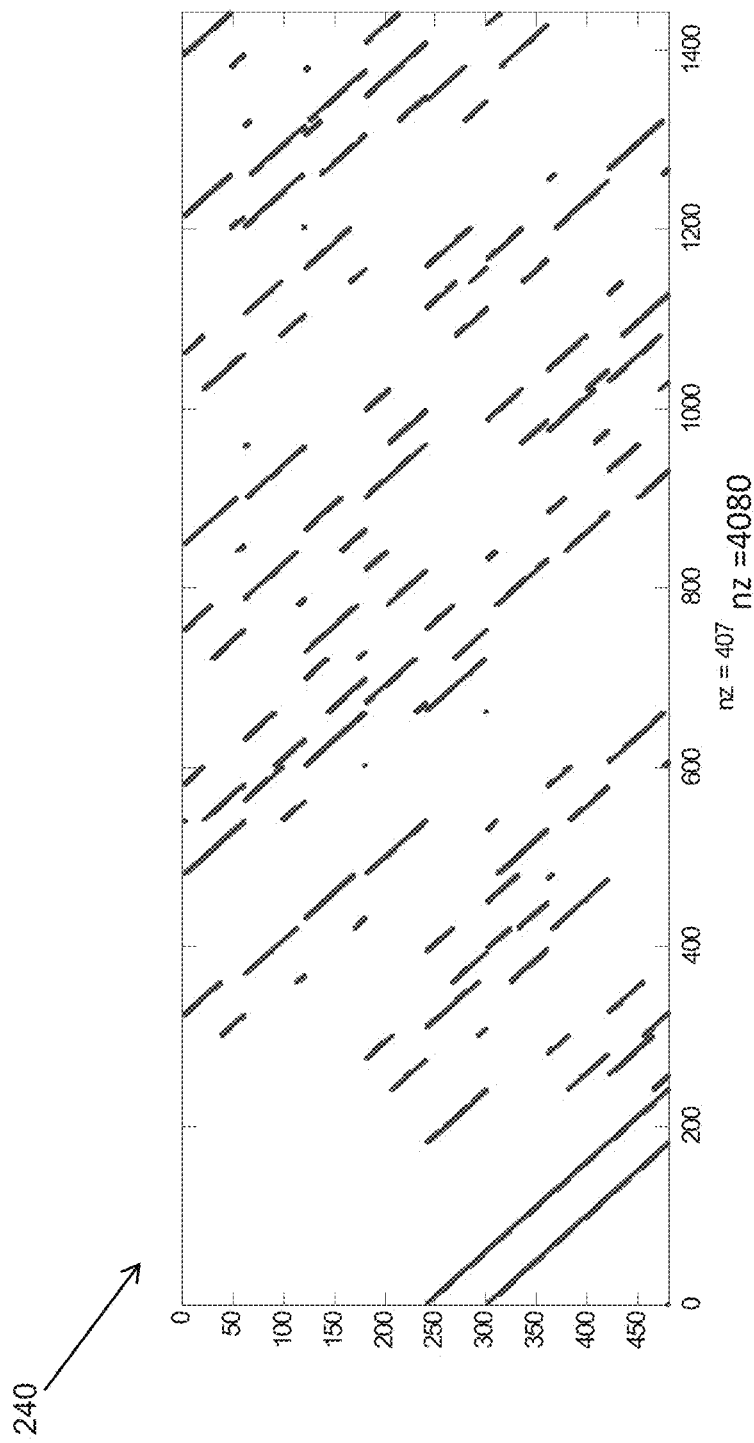
FIG. 14b is a view of a matrix of the matrix shown in FIG. 14a expanded by a factor of 60.

FIGS. 14a and 14b show literal examples of expansions for the basic rate 2/3 code structure in FIG. 12. Note that the code in FIG. 12 has a total of 17 edges between variable and check nodes. If each of these edges is replaced with a shifted identity matrix of size 4, then a plot 230 such as the one given in FIG. 14a is derived. The derived plot is the result of graph 'expansion'. Specifically, the plot shown in FIG. 14a provides a parity matrix view of the resulting graph expansion. In this view, each column represents a variable node of the code, while each row represents a check node. Note that FIG. 14a has 24 columns and 8 rows. This corresponds to 4 copies of each of the 6 variable and 2 check nodes of FIG. 12. Expanding the graph (matrix) of FIG. 14a by a factor of 60 produces the chart 240 shown in FIG. 14b. Specifically, each node in FIG. 14a has been replaced by a shifted identity matrix of size 60. Therefore, instead of 24 variable node (columns) and 8 checks (rows) there are now 1440 variable nodes (columns) and 480 checks nodes (rows). Note that there are 68 non-zero entries in FIG. 14a and 4080 (68×60) non-zeros in FIG. 14b. The method of this example (described in general in FIG. 13) is used to derive codes of arbitrary collection size N (where N is the number of RFID tags/items in the collection).

Decoding Collections of RFID Tags

Once the RFID tags of a collection of items have been encoded in accordance with an embodiment of the invention, the collection can be transported and an RFID reader can attempt to read the RFID tags of the items in the collection. An RFID reader is rarely able to read all of the RFID tags in a collection, therefore, the ECC in the code word elements that are read is used to recover the code word elements of the RFID tags that could not be read. Once a complete code word is recovered, information contained in the code word can be recovered and used to identify individual items in the collection and/or manifest information for the collection.

Figure 15:
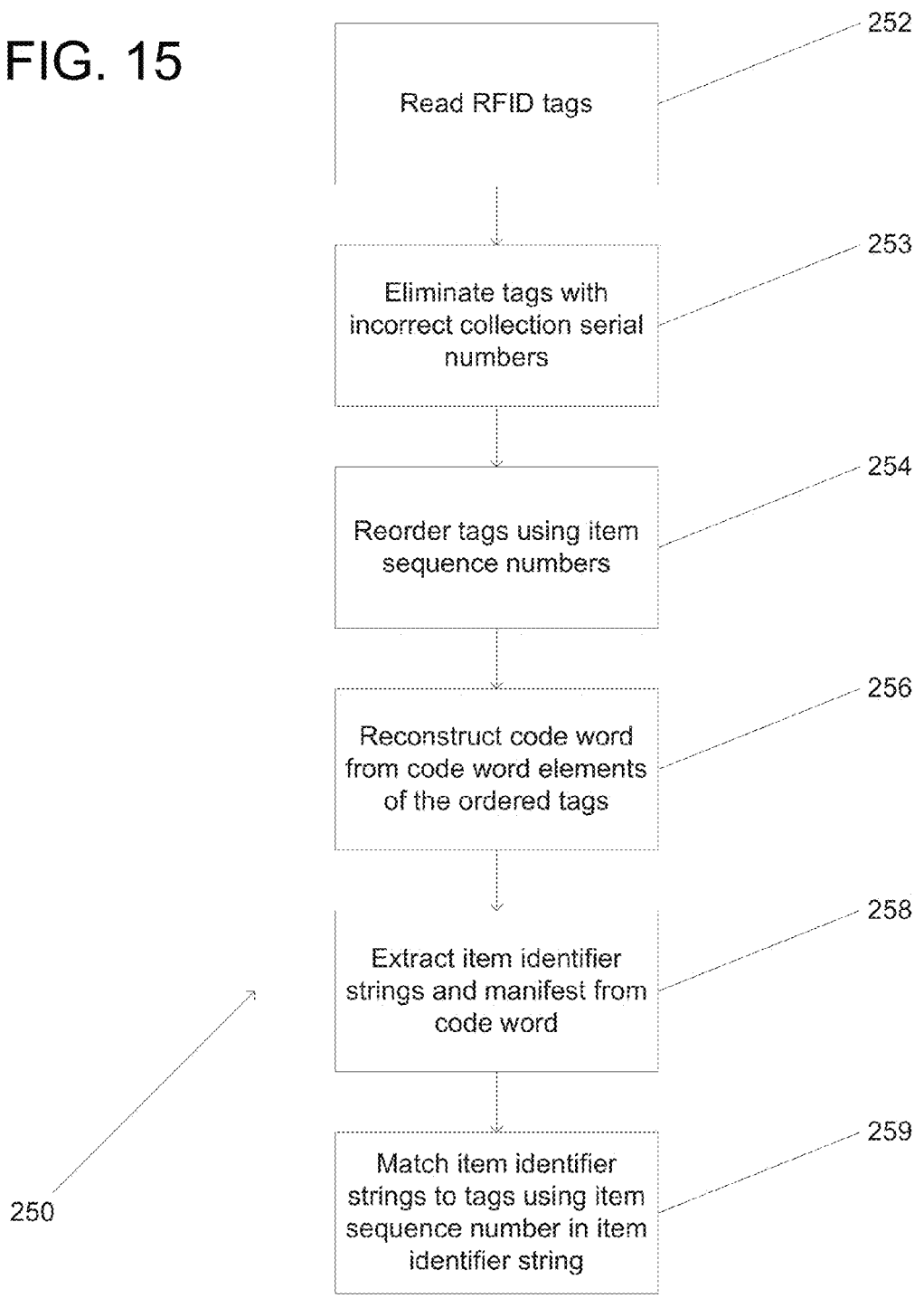
FIG. 15 is a flow chart showing a process for recovering information from the RFID tags of a collection of items in accordance with the embodiments of the invention.

A process for reading the RFID tags of a collection of items in accordance with an embodiment of the invention is shown in FIG. 15. The process 250 includes reading (252) RFID tags, eliminating (253) tags possessing unique words with a collection serial number that does not match the collection serial number of the collection being read, and reordering (254) the code word elements using the item sequence number in each code word element's corresponding unique word. A code word is then reconstructed (256) from the code word elements by utilizing the EEC to correct for any missed RFID tags and/or read errors. A list of item identifier strings and, in many instances, manifest information are then extracted (258) from the code word. In the event that an encryption or obfuscation process was used to secure the item identifier strings and/or manifest information, the code word is deinterleaved and/or decrypted using the reader's private key(s). Once a list of item identifier strings has been extracted, individual items in the collection can be identified by matching (259) the item sequence number of an item identifier string with the item sequence number of the unique word encoded on an item's RFID tag.

The reordering of encoding strings by an RFID reader in accordance with an embodiment of the invention is illustrated in FIGS. 16a-16c. FIG. 16a shows a sequence 260 of encoding strings 262 physically read from RFID tags. FIG. 16b shows a reordered sequence 260' following the reordering of the encoding strings 262 using the unique words of each encoding string. The reordering process also identifies missing tags that were not or could not be physically read. These tags are marked as erasures 264. The reconstructed block of non-erased and erased tag content forms the input to a decoder. The decoder uses the input to reconstruct the code word and outputs the code word sequence 260" shown in FIG. 16c.

Variable and Check Node Processor Based Decoding

Figure 17A:
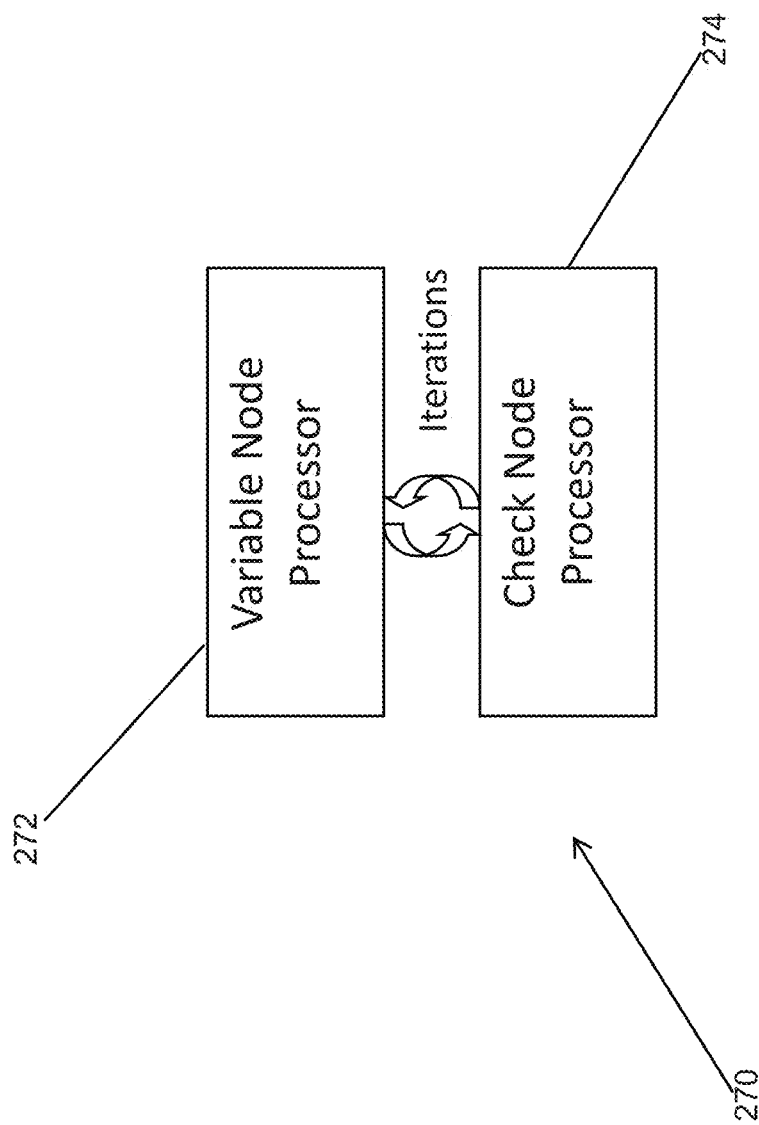
FIG. 17a is a semi-schematic illustration of a variable check node processor for reconstructing a code word from a plurality of code word elements in accordance with an embodiment of the invention.

A decoder that can be used to recover a complete set of code word elements in accordance with an embodiment of the invention is shown in FIG. 17a. The decoder 270 includes a variable node processor 272 and a check node processor 274. An input sequence similar to the sequence 260' shown in FIG. 16b is fed to the variable node processor 272, which performs iterations with the check node processor 274 until all code check nodes are satisfied or until some maximum number of iterations is reached. If all check nodes become satisfied, then the reconstructed tag data is output from the variable node processor.

Variable node updating proceeds with the relations, $$V_j \bigg|_{j=1...d_v} = V^{APP} - u_j$$

$$\text{Where, } V^{APP} = \sum_{j=0}^{d_v} u_j$$

Constraint node updating proceeds with the relations, $$U_i \bigg|_{i=1...d_c} = \left( \prod_{j \neq i} \text{sgn}(v_j) \right) \Lambda^{\ln BP}\left( \sum_{j \neq i} \Lambda^{\ln BP}(v_j) \right)$$

$$\text{Where, } \Lambda^{\ln BP}(v) = \ln\left( \frac{1+e^{-|v|}}{1-e^{-|v|}} \right)$$

FIG. 17a illustrates an abstraction of the process associated with messages being passed from variable nodes (messages denotes V) to constraint nodes (messages denotes $U_i$) in order to recover a collection of items from a subset of the collection. Specifically, let messages $U_i$ be log-likelihood ratios created by the check node processor (with the exception of $U_0$ which in the present invention is a message generated by the RFID radio receiver) and $V_j$ be log-likelihood ratios created by the variable node processor. Messages $V_j$ are defined by the relations above. The operation in the variable node update relations consist of simple additions and subtractions. Messages $U_i$ are created using a relation whose kernel is the logarithm of a hyperbolic tangent and is denoted with the symbol $\Lambda^{ln\ BP}$. In addition, and not shown in FIG. 17, is a permutation that interleaves outgoing messages $U_i$, as defined by the code, into a new order such that they may be referenced as $u_j$. The inverse interleaving procedure is applied to messages $V_i$ resulting in messages $v_j$. Again the procedure is defined by the code, in particular the parity check matrix of the code (see for example FIG. 14b), and is known by those versed in the art. Variable and check node processing operations are well understood by those conversant in the art of error correction decoding.

Figure 17B:
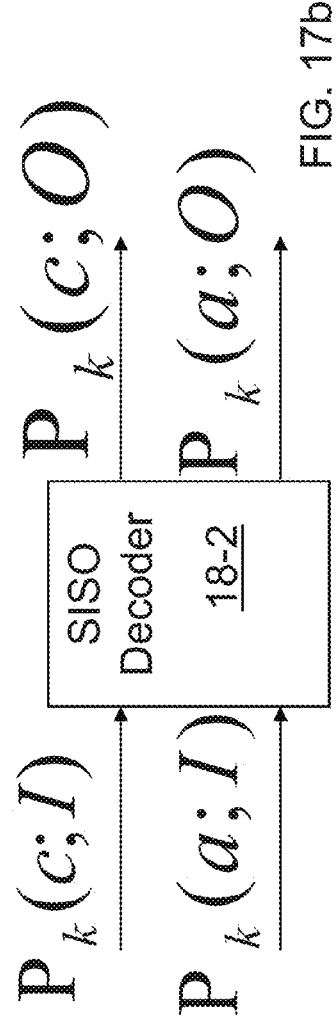
FIG. 17b is a semi-schematic illustration of Bahl, Cocke, Jelinek and Raviv (BCJR) trellis decoder.
Figure 17C:
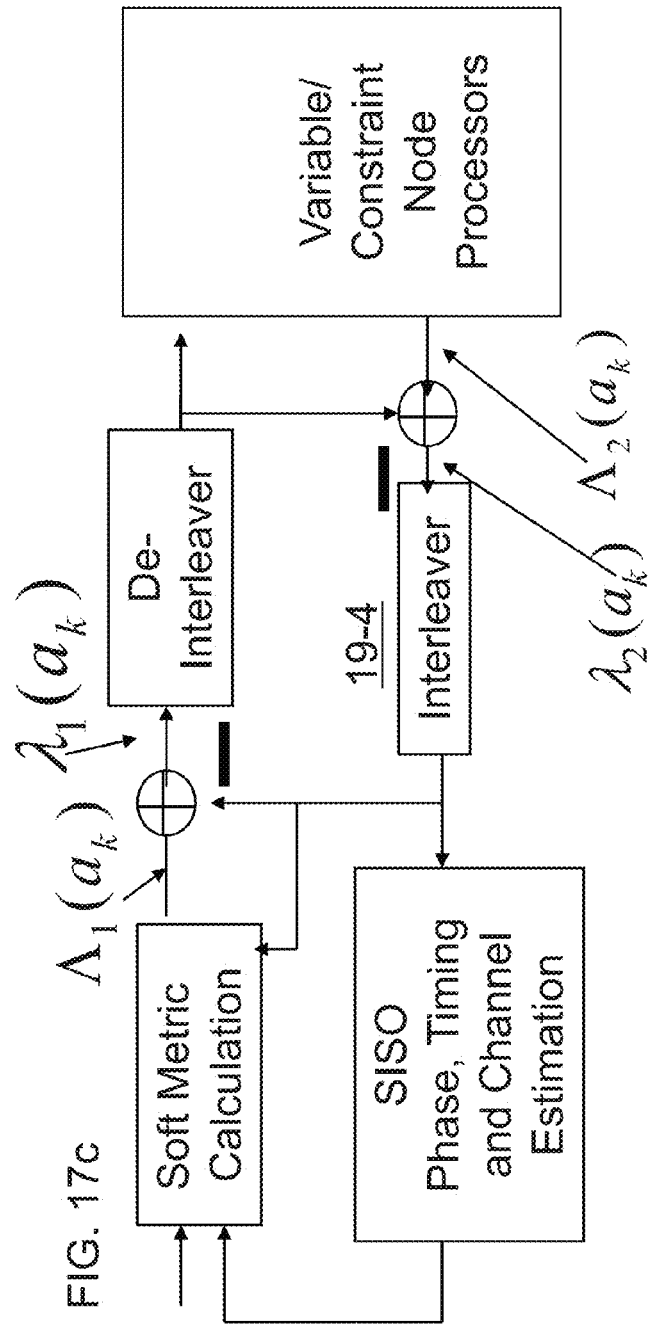
FIG. 17c is a semi-schematic illustration of the integration of a variable check node processor and a BCJR trellis encoder in accordance with an embodiment of the invention.

The variable check node LDPC decoder shown in FIG. 17a is interoperable with a Bahl, Cocke, Jelinek and Raviv (BCJR) trellis decoder. BCJR trellis decoders are discussed in the publication L. Bahl, J. Cocke, F. Jelinek, and J. Raviv, "Optimal Decoding of Linear Codes for minimizing symbol error rate", IEEE Transactions on Information Theory, vol. IT-20(2), pp. 284-287, March 1974, the disclosure of which is incorporated herein by reference in its entirety. Both the system shown in FIG. 17a and a BCJR trellis decoder employ inner iterations and exchange information via outer iterations. The exchange can aid the variable/check node processor in converging to a state where all checks are satisfied under more adverse channel or erasure conditions. In many instances, passing soft information from the BCJR to the variable check node LDPC code decoder can accommodate a received signal power that is 2 dB lower. FIGS. 17b and 17c provide additional detail regarding the BCJR trellis decoder and the manner in which the BCJR (or SISO) decoder can be connected to the variable check node processor of FIG. 17a.

A graph of simulated performance of a system utilizing encoding strings generated using the rate 1/3 code shown in FIG. 14 is illustrated in FIG. 18. The code has T=24 and N=20. This code therefore has an overall blocklength of 72*20=1440 and is appropriate for encoding 20, 96 bit RFID tags where 72 bits from each tag are determined by the codeword and 24 are determined by a unique word. The simulation included a Gaussian noise channel such that received symbols are given by $y_i=x_i+n_i$. We denote $x_i$ as the ith unit energy codeword bit (0<i<1439) and $n_i$ is the ith Gaussian noise sample. Noise samples were independent from one time instance to the next and had zero mean and variance equal to $1/(2(\text{Rate})E_b/N_o)$. The chart illustrates a significant reduction in the Bit Error Rate relative to the Packet Error Rate. The same code has been tested on a real-time system to confirm that performance is commensurate to that observed in simulation.

Electronic Proof of Delivery

The processes described above for encoding RFID tags for a collection of items and decoding RFID tags affixed to collections of items can be used in the tracking of collections of items and individual items within the collection. For electronic proof of delivery (ePOD), the retailer (recipient) and its suppliers (senders) agree either on a third trusted party to maintain a chain of sequence of public keys or each retailer shares their public key with the sender via other mechanisms (e.g. over the Internet using a secure channel such as IPsec or VPN). Whenever "verification" is desired in the supply chain, the recipient of the collection of goods uses their private key to access the item identifier strings and manifest information for the collection, which can be streamed into a database. Business intelligence and back end database software can manipulate the database to analyze the collected information for business purposes.

A flow chart of the various stages of a supply chain for tracking a collection of items and ePOD in accordance with an embodiment of the invention is shown in FIG. 19. The process 320 commences with provision (322) of EPC data that is used to generate (324) code word elements and unique words. The code word elements and the unique words are written (326) to EPC/IOC compliant RFID tags that are printed in real time. The RFID tags are applied (328) to each item/case in the formation of a collection, such as a pallet. A pallet tag is often used to provide an optional mechanism to distribute the public key encrypted interleaver seed, to enable proper authentication and decoding of the tags associated with the received goods. In embodiments where a pallet RFID tag is encoded with information used in the decoding process, then the pallet RFID tag is also applied (330) to the pallet, and the pallet is shipped (332) through the supply chain logistics (e.g. truck, ship, rail, etc.). Once, the pallet reaches its first destination, the pallet is read (334) and the encoding strings and corresponding recovered EPC data are sent to a database 336 for further analysis and processing by business intelligence and back end software.

Inventory Control

Figure 20:
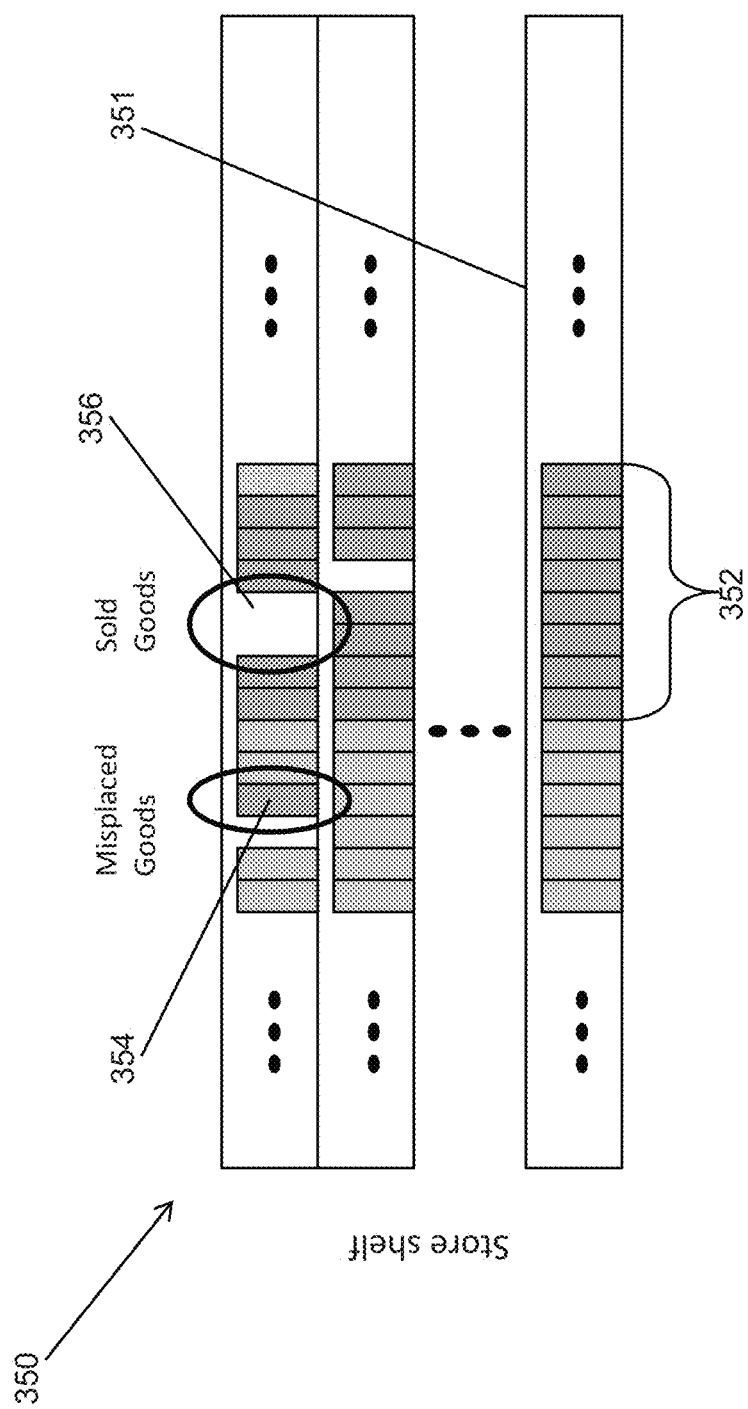
FIG. 20 is a conceptual illustration of goods bearing RFID tags in accordance with an embodiment of the invention, which are located on store shelves.

When a collection arrives at a retail location, the collection is typically broken up and the items stored. FIG. 20 illustrates a typical storage area in a retail store. The storage area 350 includes a number of storage shelves 351 on which goods are stacked. A subset 352 of a collection of goods received by the retail store is stacked in a region of the shelves 351. During stacking or as time passes, goods may be moved relative to the region allocated for the subset of goods. In addition, goods are removed from the shelves as goods are sold. In the illustrated embodiment, both misplaced goods 354 and gaps 356 where goods have been removed and sold are shown.

A database containing the encoding strings of the RFID tags affixed to each of the items in the collection and the EPC data corresponding to the item to which each RFID tag is affixed can be used to perform a variety of inventory control functions. The inventory control functions include tracking the sale of goods and helping locate misplaced items. In the arrangement shown in FIG. 20 and other similar storage configurations, items tagged using encoding strings in accordance with embodiments of the invention can be selectively interrogated with zero probability of false inclusion of other tags from another collection. When the selective interrogation capability is combined with a database of the encoding strings of the RFID tags of items stored in a storage area and the location of the items, it is possible to invoke queries such as: identify all items in isle 13, shelve 14; notify if isle 13, shelve 14 has less than N items; notify if any item moves from isle 12, shelve 2. Each of these queries may also point to shelves that are unions or intersections (if overlapped) of cubes.

Figure 21:
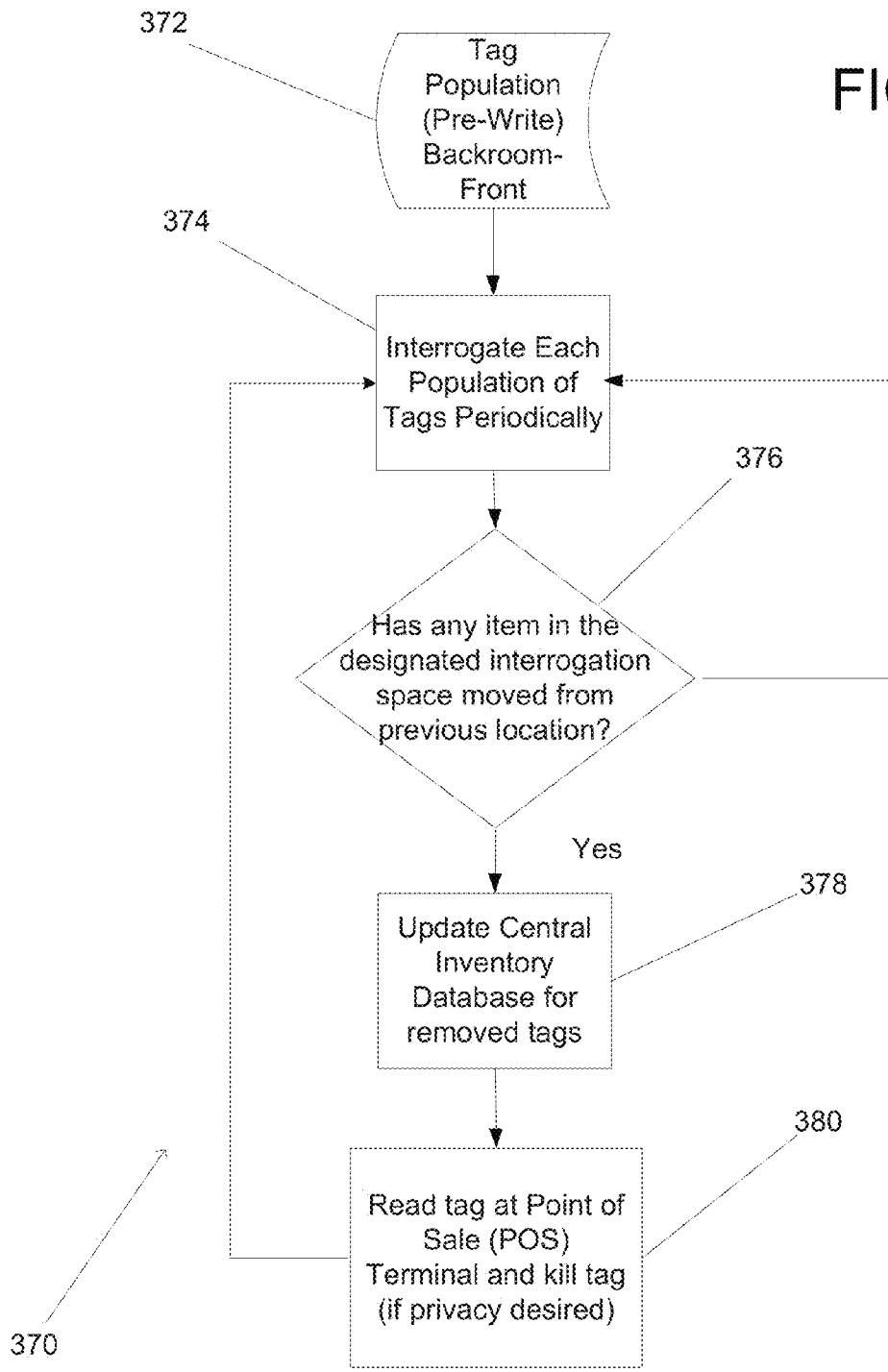
FIG. 21 is a flow chart showing a process for performing inventory control in accordance with an embodiment of the invention.

By way of example, the flow chart in FIG. 21 illustrates a business process for retail store shelf management, item tracking and transaction processing. The process 370 begins as a stored list (372) of RFID tag information arrives in for inventory replenishment of a particular population of tags on the store shelf. Once the tagged items are placed on the store shelf, the RFID reader system periodically interrogates (374) each interrogation space. If "verification" (376) is achieved the system continues interrogating. In the event that any item in the interrogation space is moved, the RFID reader system has the capability to detect such a displacement as shown in the step in the flow chart. If this movement is detected, the central inventory table database is updated (378) via the RFID reader system and the encoding string table for the parent collection of the RFID tag is punctured (380). The parent collection can refer to the group of tags associated, for example, by a region in the storage area. When the tag reaches the point-of-sale terminal (i.e. cashier) or a portal exit, the tag or some portion of it, may optionally be killed (380) to protect the consumer's privacy and prevent issues that may arise were someone to attempt to associate the tag content with the consumer.

Figure 22:
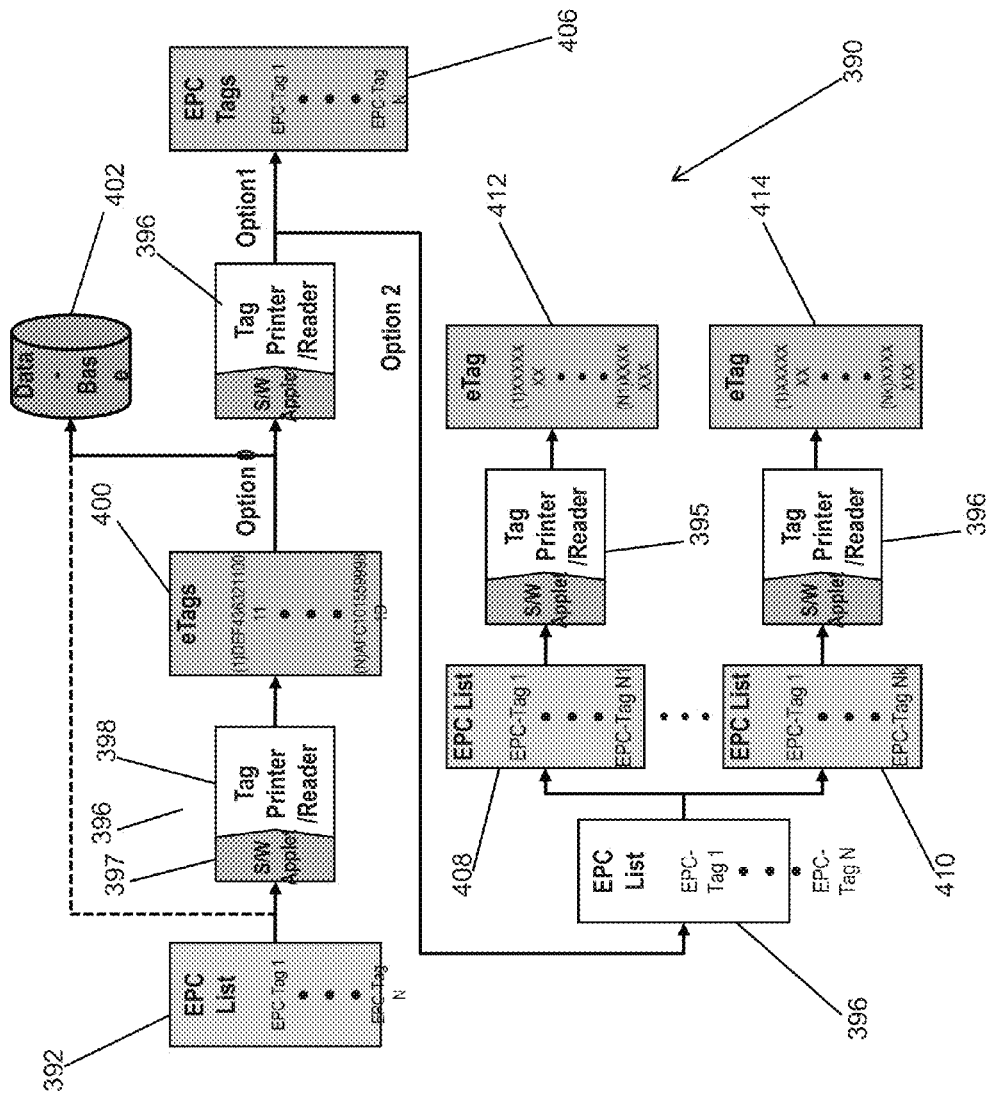
FIG. 22 is a semi-schematic illustration of a system for performing inventory control in accordance with an embodiment of the invention.

In the embodiment illustrated in FIG. 21, the initial stored list of RFID tag information can be based upon the encoding strings stored in the RFID tags of items as they are received at the retail location. The stored list of RFID tag information can also be based upon encoding strings generated on site to describe the collection being stored in the storage area. In other words, a choice can be made as to whether to reencode the RFID tags of received goods or as to whether to simply use existing encoding strings. In many instances, a mixture of both approaches is utilized. A process that includes both options is shown in FIG. 22. The process 390 shows the receipt of a list of item identifier strings. The list is provided to a tag printer 396 that includes a software applet 397 and a printer 398 that enable the printing of RFID tags containing encoding strings generated using at least all of the item identifiers strings. The RFID tags are then read by an RFID reader 496 and decoded. The decoded item identifier strings and the encoding strings read from the RFID tags are stored in a database 402. Once the database is available, the encoding strings can be used in place of the item identifier strings because a unique map 406 of each encoding string to a corresponding item identifier string tag is maintained. In other embodiments, if a pallet lot is to be split into smaller lots, a separate list of item identifier strings is generated for each small lot 408, 410. The small lot can go through the same process of encoding and decoding as described above using tag readers and printers 396 to generate new encoding strings 412, 414 for the smaller lots. In several embodiments, each item's RFID tag is encoded with a new encoding string. In a number of other embodiments, each item's original RFID tag is cancelled and a new RFID tag containing a new encoding string is affixed to the item.

While the above description contains many specific embodiments of the invention, these should not be construed as limitations on the scope of the invention, but rather as an example of one embodiment thereof. For example, many of the embodiments described above convert information such as EPC codes and manifest information into a code word and then encode RFID tags with code word elements. A number of embodiments of the invention encode each RFID tag with identifying information, such as an EPC code, and a code word element. In many embodiments, RFID tags can be encoded with any variety of information in addition to a code world element. Accordingly, the scope of the invention should be determined not by the embodiments illustrated, but by the appended claims and their equivalents.

What is claimed is:

1. A method of reconstructing item identifier strings that identify items in a collection using information read from RFID tags affixed to the items, the method comprising:

receiving, using a processor, a plurality of data packets read from a batch of RFID tags, where each data packet includes redundancy provided by a coding scheme, where information for each RFID tag in the batch is shared among the RFID tags in the batch in the form of redundancy provided by the coding scheme, and where a code correction capability of the data packets enables the information of all of the RFID tags in the batch of RFID tags to be reconstructed by reading the data packets of a subset of the batch of RFID tags;

reordering the received plurality of data packets using an item sequence number extracted from each of the received plurality of data packets using the processor;

generating a code word from a set of code word elements comprising a code word element extracted from each of the received plurality of data packets using the processor; and extracting a plurality of item identifier strings from the code word using the processor, where the plurality of item identifier strings identify items in the collection.

2. The method of claim 1 further comprising matching at least one item identifier string to an RFID tag by matching an item sequence number within the at least one item identifier string with an item sequence number extracted from a data packet read from the RFID tag in the batch of RFID tags.

3. The method of claim 1 further comprising eliminating data packets of the received plurality of data packets having an incorrect collection serial number portion of the data packet.

4. The method of claim 1 wherein generating a code word from a code word element portion of each of the received plurality of data packets using the processor comprises identifying at least one missing code word element.

5. The method of claim 4 wherein generating a code word from a code word element portion of each of the received plurality of data packets using the processor further comprises recovering at least one missing code word element using error correction code from at least one read data packet.

6. The method of claim 1 wherein extracting a plurality of item identifier strings from the code word using the processor comprises decrypting the code word.

7. The method of claim 1 wherein extracting a plurality of item identifier strings from the code word using the processor comprises deinterleaving the code word.

8. The method of claim 1 further comprising extracting manifest information from the code word.

9. The method of claim 8 wherein the manifest information comprises the time and location of construction of a pallet of the items and intended destination of the pallet.

10. The method of claim 1, wherein the coding scheme is a block coding scheme.

11. The method of claim 10, wherein the block coding scheme is a BCH coding scheme.

12. The method of claim 10, wherein the block coding scheme is an RS coding scheme.

13. The method of claim 1, wherein the coding scheme is an LDPC coding scheme.

* * * * *